(12) United States Patent
Morioka

(10) Patent No.: US 11,601,559 B2
(45) Date of Patent: Mar. 7, 2023

(54) INFORMATION PROCESSING DEVICE AND METHOD FOR CONTROLLING INFORMATION PROCESSING DEVICE

(71) Applicant: SHARP KABUSHIKI KAISHA, Sakai (JP)

(72) Inventor: Hirohito Morioka, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 17/462,856

(22) Filed: Aug. 31, 2021

(65) Prior Publication Data

US 2022/0070314 A1 Mar. 3, 2022

(30) Foreign Application Priority Data

Sep. 1, 2020 (JP) .............................. JP2020-146922

(51) Int. Cl.
*H04N 1/00* (2006.01)
*G06F 3/04847* (2022.01)

(52) U.S. Cl.
CPC ..... *H04N 1/00482* (2013.01); *H04N 1/00384* (2013.01); *H04N 1/00413* (2013.01)

(58) Field of Classification Search
None
See application file for complete search history.

(56) References Cited

U.S. PATENT DOCUMENTS

| | | | | |
|---|---|---|---|---|
| 6,469,719 B1* | 10/2002 | Kino | ............... | G06F 3/0482 715/825 |
| 6,734,882 B1* | 5/2004 | Becker | ............... | G06F 3/0482 715/788 |
| 7,117,450 B1* | 10/2006 | Chaudhri | ............ | G06F 3/04847 715/833 |
| 7,444,599 B1* | 10/2008 | Chaudhri | .............. | G06F 3/0485 715/830 |
| 9,588,661 B1* | 3/2017 | Jauhal | ................. | G06F 3/04842 |
| 2004/0119751 A1* | 6/2004 | Yoshimi | ............. | G06F 3/04886 715/773 |
| 2005/0210062 A1* | 9/2005 | Ordille | .................... | H04M 3/42 |
| 2005/0278653 A1* | 12/2005 | Scholz | ................. | G06F 3/0482 715/842 |
| 2007/0057426 A1* | 3/2007 | Tao | .................... | G03G 15/6582 270/58.09 |
| 2007/0233902 A1* | 10/2007 | Trefler | ................... | G06N 5/025 709/246 |
| 2007/0252824 A1* | 11/2007 | Okada | ................... | G06F 3/0219 345/173 |
| 2008/0195405 A1* | 8/2008 | Lopez | ................... | G06Q 30/06 705/1.1 |

(Continued)

FOREIGN PATENT DOCUMENTS

JP 2007-298694 A 11/2007
KR 20120009889 * 2/2012 ............ G06F 3/023

*Primary Examiner* — Beniyam Menberu
(74) *Attorney, Agent, or Firm* — ScienBiziP, P.C.

(57) ABSTRACT

An information processing device including a numerical value inputter that inputs a numerical value, the information processing device comprising: a display that displays the numerical value inputter on an operation screen; and a numerical value inputting method controller that selects a numerical value inputting method of the numerical value inputter based on a physical display size of the numerical value inputter relative to the operation screen.

11 Claims, 17 Drawing Sheets

(56) References Cited

U.S. PATENT DOCUMENTS

| | | | |
|---|---|---|---|
| 2009/0064050 A1* | 3/2009 | Aono | H04N 1/00464 |
| | | | 715/843 |
| 2010/0175028 A1* | 7/2010 | Nozaki | H04N 5/23216 |
| | | | 715/830 |
| 2016/0165091 A1* | 6/2016 | Ooba | G06F 3/1204 |
| | | | 358/1.15 |
| 2017/0068448 A1* | 3/2017 | Ghassabian | G06F 1/1671 |

* cited by examiner

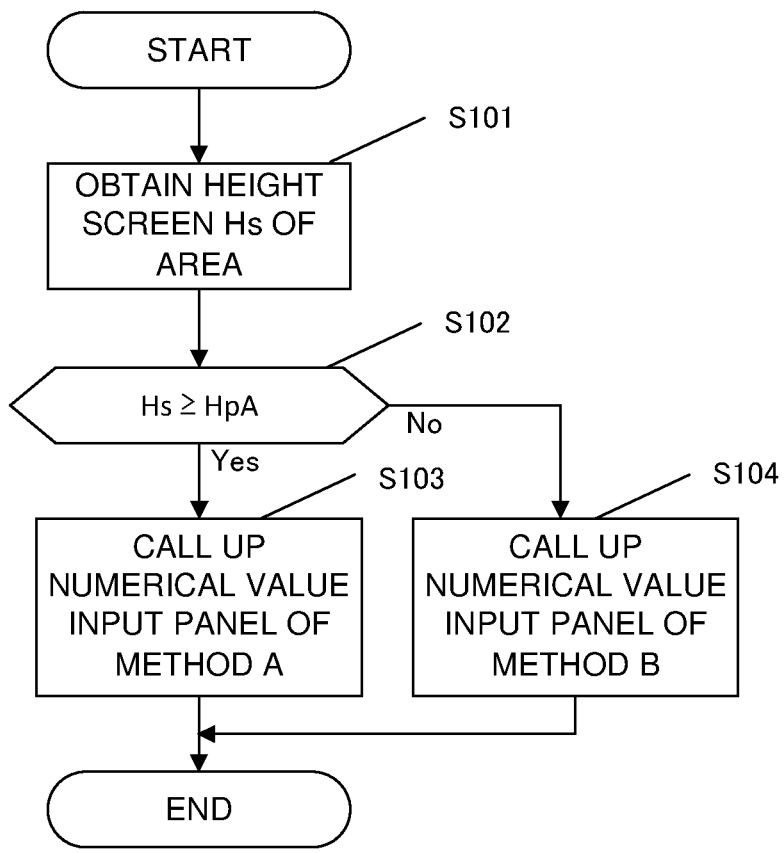

FIG. 12

| SETTING SCREEN | SETTING ITEM | INPUTTING METHOD | DISPLAY POSITION |
|---|---|---|---|
| ORIGINAL - DIRECT ENTRY | HEIGHT | METHOD A | CENTER |
| | WIDTH | METHOD A | CENTER |
| ERASE SPECIFIED RANGE | START POINT X | METHOD B | LOWER RIGHT |
| | START POINT Y | METHOD B | LOWER RIGHT |
| | HEIGHT | METHOD B | LOWER RIGHT |
| | WIDTH | METHOD B | LOWER RIGHT |
| MARGIN SHIFT | WIDTH | METHOD A | CENTER |
| ⋮ | ⋮ | ⋮ | ⋮ |

INFORMATION PROCESSING DEVICE AND METHOD FOR CONTROLLING INFORMATION PROCESSING DEVICE

BACKGROUND OF THE INVENTION

Field of the Invention

The present invention relates to an information processing device having, in an operator, a function for inputting numerical values from an appropriate option.

Description of the Background Art

Conventionally, in an image forming device, various sizes other than the general sizes such as A4 and B5 of JIS are required for output prints.

Therefore, when inputting an output size into the image forming device, a user, as the case may be, want or must input the output size in fraction. For example, in the standard paper size of inch system, in general, a value after the decimal point is expressed in fraction.

Since the user memorizes these paper sizes in fraction, it is not easy to input the decimal value after the decimal point.

In addition, when a fraction is directly input as a decimal number, a problem may arise such as a possibility of mistakenly inputting a numerical value equivalent to an unspecifiable fraction, and a difficulty of how to handle an input error of an infinite decimal number.

As described above, there are many cases where the user wants to input the size in a fractional format.

Generally, when inputting a fraction, a symbol "/" is used. In the case of 8.5 (inch), however, it is necessary to separate the integer part and the fraction part such as "8½". Therefore, a mechanism of inputting a defined delimiter such as a space, a period "." or the like is used between them, or a UI (user interface) for separately inputting the integer part and the fraction part is to be provided. These are all complicated to operate.

When combinations of fractional values that can be inputted are limited, a general method for selecting one of options can be used.

FIG. 17 shows an example of an image forming device in which the paper size is inputted as a numerical value in which the integer part and the fraction part are integrated by an operator displayed on an input screen.

As shown in FIG. 17, in a numerical value input panel (k101) of the operator, the numerical value of each of a lateral size (X) and a longitudinal size (Y) is integrally displayed with an integer and a fractional value in a set value display k103 for setting numerical values, and an up (upward triangle) and down (upward triangle) operation buttons k102 is arranged adjacent to the set value display k103.

One common method of setting numerical values is "up/down button method". To explain referring to the example of FIG. 17, in the "up/down button method," a desired numerical item is selected by operating the up and down operation button k102 to up from small to large or down vice versa, the numerical value of the option in the set value display k103.

Another method is called a "drop-down list", "pull-down menu", or "select box", in which tapping an inputter displays a list of options from which the user can select.

Alternatively, a method called "radio button" in which all options are preliminarily displayed on the screen and one of them is selected, or a method called "slider" in which displayed options are selected with a sliding knob, are used.

Any of the above methods is used in the operator that allows manual input of the general inch system size.

In the case of limited combinations of necessary numerator/denominator, making a configuration of presenting all the options on the input screen and allowing the user to select from the input screen will help the user better understand and easily select.

For example, there is disclosed an image forming device which is provided with a display for displaying various pieces of information and a 10-key (numeric keypad) for inputting numerical value information, and in which a set value involving a fraction is input by the numeric keypad, and inputting the numerical value information that corresponds to a numerator of the fraction displays the numerical value information, as a numerical value of the numerator, on the display together with a fraction symbol (see Japanese Unexamined Patent Application Publication No. 2007-298694).

In addition, an inputting method in which an integer part is input by using a 10-key (numeric keypad) that resembles a general calculator and only a fraction part is selected by using a slider has been realized, but this method has a problem that it is difficult to operate the slider when the operator displayed on the screen is small.

In the information processing device, there are provided various sizes for operation screens that display the operator, but there has been proposed no technology that appropriately selects a numerical value inputting method according to the size of the screen.

The present invention has been made in consideration of the above circumstances, and it is an object of the present invention to provide an information processing device capable of selecting an inputting method in which, on various sizes of operation screens, options are easy to see and an input operation is easy to perform.

SUMMARY OF THE INVENTION

An information processing device including a numerical value inputter that inputs a numerical value, the information processing device comprising: a display that displays the numerical value inputter on an operation screen; and a numerical value inputting method controller that selects a numerical value inputting method of the numerical value inputter based on a physical display size of the numerical value inputter relative to the operation screen.

A controlling method of an information processing device that displays, on an operation screen, a numerical value inputter that inputs a numerical value, the controlling method comprising: obtaining a physical display size of the numerical value inputter relative to the operation screen; and controlling a numerical value inputting method, wherein the controlling selects the numerical value inputting method of the numerical value inputter based on the obtained display size. The present invention is a program that executes each step of the control method of the above information processing device.

According to the information processing device of the present invention, the numerical value inputting method controller selects the numerical value inputting method of the numerical value inputter based on the physical display size of the numerical value inputter relative to the operation screen, thus, in the various sizes of operation screens, bringing an excellent effect that the optimum numerical value inputting method of the numerical value inputter can be provided.

BRIEF DESCRIPTION OF THE DRAWINGS

FIGS. 3A to 3E indicate an illustration of a numerical value input panel (numerical value inputter) displayed on a display according to a first embodiment, in which FIG. 3A is a view of a method A, FIG. 3B is a view of an initial state of a method B, FIG. 3C is a view of an open state of the method B, FIG. 3D is a view of a numerical value input panel for a screen of a display according to one example, and FIG. 3E is a view of a numerical value input panel for a screen of a display according to another example.

FIGS. 4A to 4B indicate an illustration of input of the method A in the display according to the first embodiment, in which FIG. 4A is an illustration of an Original-Direct Entry screen and FIG. 4B is an illustration of the numerical value input panel displayed.

FIGS. 5A to 5B indicate an illustration of input following FIGS. 4A to 4B, in which FIG. 5A is an illustration of the display state of the numerical value input panel where a fraction is selected, and FIG. 5B is an illustration of determination of an input value of the numerical value input panel.

FIGS. 6A to 6B indicate an illustration of input of the method B in the display according to the first embodiment, in which FIG. 6A is an illustration of the Original-Direct Entry screen and FIG. 6B is an illustration of the numerical value input panel displayed.

FIGS. 7A to 7B indicate an illustration of input following FIGS. 6A to 6B, in which FIG. 7A is an illustration of the display state of the numerical value input panel where the fractional value inputter is selected, and FIG. 7B is an illustration of setting of the input value of the numerical value input panel.

FIG. 8 is a flowchart of a procedure for switching the inputting methods according to the first embodiment.

FIGS. 9A to 9B indicate an illustration of the display in the case of setting, with the method B, a specified range erasing function in the display according to a second embodiment, in which FIG. 9A shows the display screen of the display with the specified range erasing function selected, and FIG. 9B shows the display state of the numerical value input panel with a setter of a start point X tapped.

FIGS. 10A to 10B indicate an illustration of input following FIGS. 9A to 9B, in which FIG. 10A shows the state in which an option list pops up, and FIG. 10B shows the state in which the selected fraction is set in the fraction inputter.

FIGS. 11A to 11B indicate an illustration of input following FIGS. 10A to 10B, in which FIG. 11A is the setting state of the start point X, and FIG. 11B is an illustration of completion of the setting of the specified range erasing function.

FIG. 12 is an illustration of an algorithm that switches the inputting method for each setting item.

FIGS. 13A to 13B indicate an illustration of a Margin Shift setting in the display according to a third embodiment, in which FIG. 13A is an example of the setting screen display, and FIG. 13B is an example of a display state of the numerical value input panel.

FIG. 14B is an illustration of completion of the setting.

DESCRIPTION OF THE PREFERRED EMBODIMENTS

An embodiment of the present invention will be described below with reference to the accompanying drawings.

Figure 1:
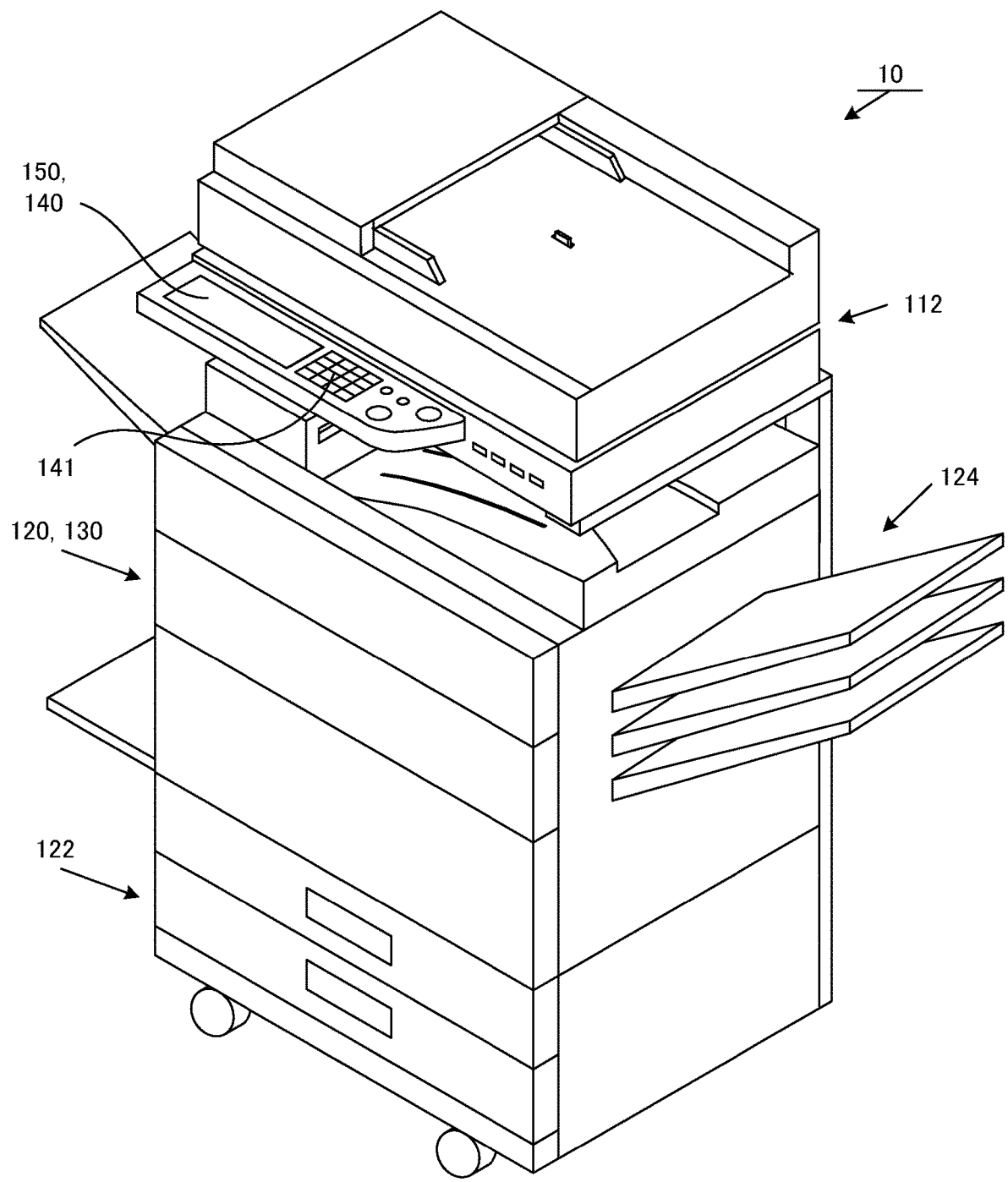
FIG. 1 is an illustration of an image forming device to which an information processing device according to an embodiment is applied.

First, the configuration of an image forming device 10 for the embodiment will be described. As shown in FIG. 1, the image forming device 10 is an information processing device that is provided with a document reader 112 at the upper part of the image forming device 10 to read an image of a document and output an image by using an electrophotographic method.

Figure 2:
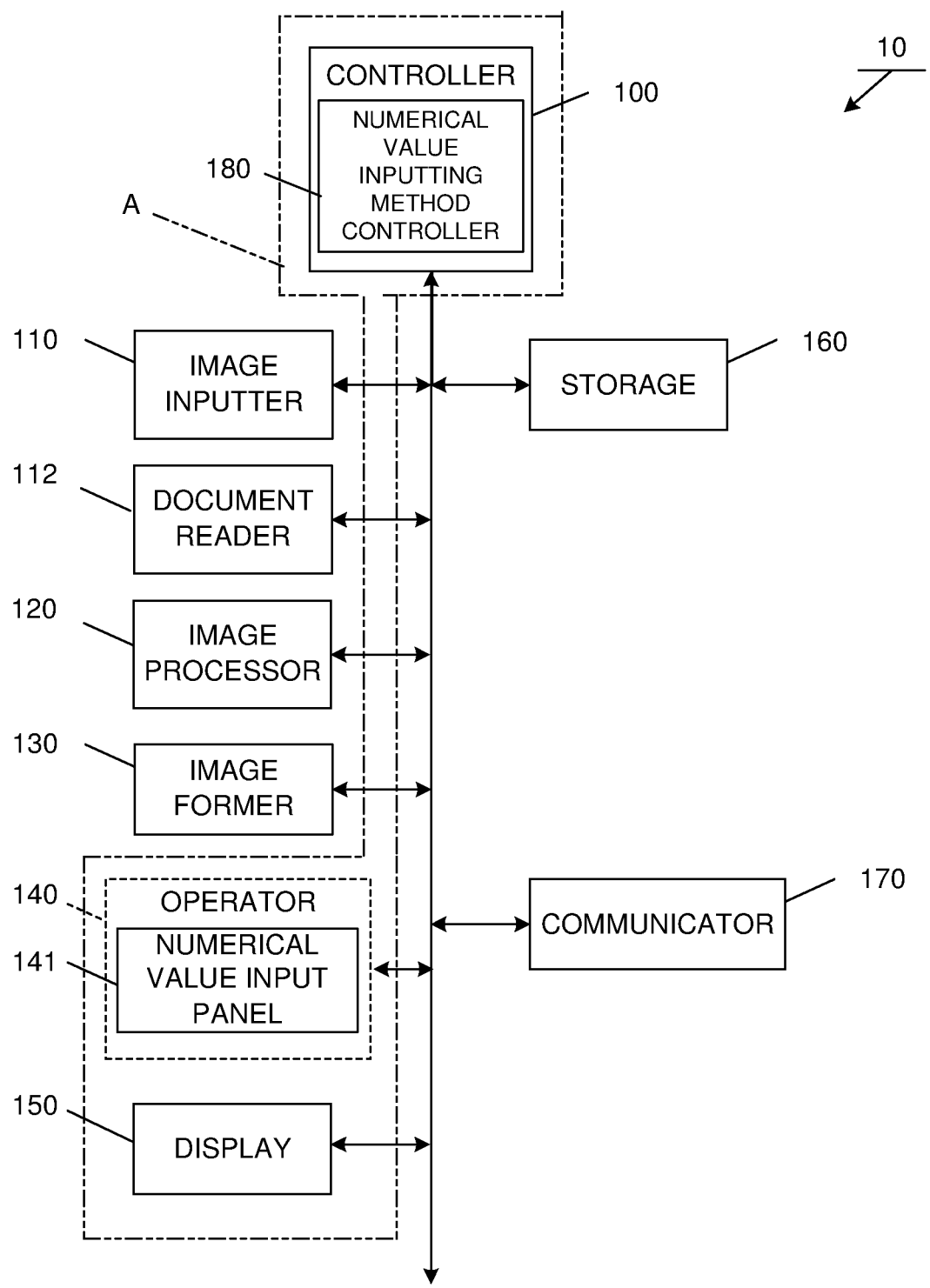
FIG. 2 is a block diagram of the image forming device of FIG. 1.

As illustrated in FIG. 2, the image forming device 10 mainly includes a controller 100, an image inputter 110, the document reader 112, an image processor 120, an image former 130, an operator 140, a display 150, a storage 160, and a communicator 170.

The controller 100 is a functional part for controlling the whole of the image forming device 10. The controller 100 realizes various functions by reading and executing various programs, and includes, for example, one or more arithmetic devices (for example, CPU (Central processor), or the like).

The image inputter 110 is a functional part for reading image data that is to be input to the image forming device 10. Further, the image inputter 110 is connected to the document reader 112 which is a functional part for reading the image of a document, and inputs the image data that is output from the document reader 112.

The image inputter 110 may also input image data from a storage medium such as a USB memory, an SD card, or the like. Further, the image data may also be input from another terminal device by the communicator 170 that provides connection with another terminal device.

The document reader 112 has a function of optically reading a document placed on a contact glass (not shown) and passing scan data to the image former 130.

The image processor 120 is a functional part for forming, on a recording medium (for example, recording paper), output data which is based on the image data. For example, as shown in FIG. 1, the recording paper is fed from a paper feed tray 122, and after an image is formed on the surface of the recording paper in the image processor 120, the recording paper is discharged from a paper discharge tray 124. The image processor 120 includes, for example, an electrophotographic laser printer.

The image former 130 has a function to convert the image data into a set file format (TIFF, GIF, JPEG, etc.) based on the image data read by the document reader 112. Then, the output image is formed based on the image data that has been subjected to the image process.

The operator 140 is a functional part for receiving an operation instruction by a user, and is composed of various key switches, a device for detecting input by contact, and the like. Via the operator 140, the user inputs a function and an output condition which are to be used.

The display 150 is a functional part for displaying various pieces of information to the user and is configured, for example, with an LCD (Liquid Crystal Display).

That is, the operator 140 provides a user interface for operating the image forming device 10, and the display 150 displays various setting menu screens and messages of the image forming device.

In the image forming device 10, as shown in FIG. 1, the operator 140 has a numerical value input panel 141 as a numerical value inputter which inputs a numerical value as a device for detecting input by contact.

The image forming device 10 is provided with a touch panel in which the operator 140 and the display 150 are integrally configured. An operation screen is displayed on the display 150, and an operable area of the operator 140 depends on the screen size of the display 150.

In this case, a method of detecting an input of a touch panel may be a common detection method such as a resistor film method, an infrared-ray method, an electromagnetic induction method, and a capacitance method. The touch can be detected by any of pressure, contact or proximity.

The storage 160 is a functional part in which various programs including a control program necessary for the operation of the image forming device 10, various data including reading data, and any user information are stored. The storage 160 includes, for example, a non-volatile ROM (Read Only Memory), a RAM (Random Access Memory), an HDD (Hard Disk Drive), and the like. The storage 160 may also be provided with a Solid State Drive (SSD) which is a semiconductor memory.

The communicator 170 provides a communication connection with an external device. A communication interface (communication I/F) used for sending and receiving data is provided as the communicator 170. With the user's operation at the image forming device 10, the communication I/F allows the data stored in the storage of the image forming device 10 to be sent to and received by another computer device connected via a network.

The image forming device of the embodiment has an information processing device provided with the numerical value input panel 141 of a numerical value inputter for inputting numerical values in a method which differs according to a display area.

As shown in FIG. 2, an information processing device (A) has the numerical value input panel 141 as the numeric value inputter of the operator 140, the display 150 that displays the numerical value input panel 141 on the screen, and a numerical value inputting method controller 180 (controller 100) that selects a numerical value inputting method of the numerical value input panel 141 based on a physical display size of the numerical value input panel 141 relative to a screen of the display 150.

When the information processing device is applied to various devices having the displays 150 with display sizes different from each other, the numerical value inputting method controller 180 selects the numerical value inputting method of the numerical value input panel 141 according to the size at which the numerical value input panel 141 of the operator 140 is displayable on the screen of the display 150.

The information processing device according to the embodiment will be described in detail below. Herein, a description will be made about a case in which, as a numerical value to be input in the information processing device, a length in inches as an example of handling fractional values is input.

In the following description, the band fraction "8 and ½" will be denoted as "8½". A printer and a scanner may specify the size of the paper, or may specify areas of a margin or of an image.

In countries and regions that use the inch unit system, such as the United States, the basic unit of and the length of paper are generally specified based on the inch system.

The following paper is an example of fixed paper that cannot be represented by an integer value.
Executive (EXEC) 7¼×10½, and
Mexican Legal 8½×13⅖ (8.5×13.4).

The newspaper format also includes sizes expressed by ¾ and ⅜, such as Tabloid 11¼×15¾, and Berliner judge (Berliner) 12⅜×18½. ⅜ is 0.375 in decimal number, so it is obvious that the fraction is more intuitive and easier to understand.

When the format is caused to select these common fractional values from candidates, most of the values can be easily input by allowing the user to input eight values "0, ⅛, ¼, ⅜, ½, ⅝, ¾, ⅞" in ⅛ unit.

Of course, depending on the application or purpose, it is possible to select based on ¹⁄₁₀ unit or ¼ unit, or each numerical value does not have to be equally spaced. For example, when "⅖" of Mexican Legal is needed, the user may add "⅖".

Although the description here is based on an example concerning the length of paper, the embodiment is not limited to the paper size. When the user wants to input the value after the decimal point as a fraction, the above is also applicable to other types of lengths and to any unit other than length.

In the following, specific size inputting methods are explained with examples.

As an example of inputting the fractional value, the following will make a description based on a function that inputs the value after the decimal point when inputting the length, the width, or the coordinate position in inch unit system.

The following three embodiments are specific examples of make a selective use by switching between two numerical value input panel inputting methods (method A and method B).

First Embodiment: Selective Use Depending on Screen Sizes

Large screen (10 (inch))→method A (slider type): Original-Direct Entry (FIGS. 4A to 4B, FIGS. 5A to 5B)
Small Screen (7 (inch))→method B (select box type): Original-Direct Entry (FIGS. 6A to 6B, FIGS. 7A to 7B)

Second Embodiment: Selective Use Depending on Size of Space Available for Input Operation in Each Function Wide display area function→Method A: Original-Direct Entry (FIGS. 4A to 4B, FIGS. 5A to 5B)
Narrow display area function→Method B: Erase Specified Range (FIGS. 9A to 11B)

Third Embodiment: Selective Use of Setting Items Depending on the Number of Options Few options→Method A: Margin shift (FIGS. 13A to 13B, FIGS. 14A to 14B)
Many options→Method B: Erase Specified Range (FIGS. 9A to 11B)

First, the characteristics of each of the two methods of fractional value input (method A and method B) will be described.

Method A: Slider type (see FIG. 3A, etc.) is used as an example.

The method A is an inputting method in which all options are displayed on the operator from the beginning so that such options can be listed, and the desired value can be selected with a single touch.

In general, the method A includes formats called a slider, a radio button, a list box, etc. In this format, the more the options, the larger the display area is required.

Figure 3A:
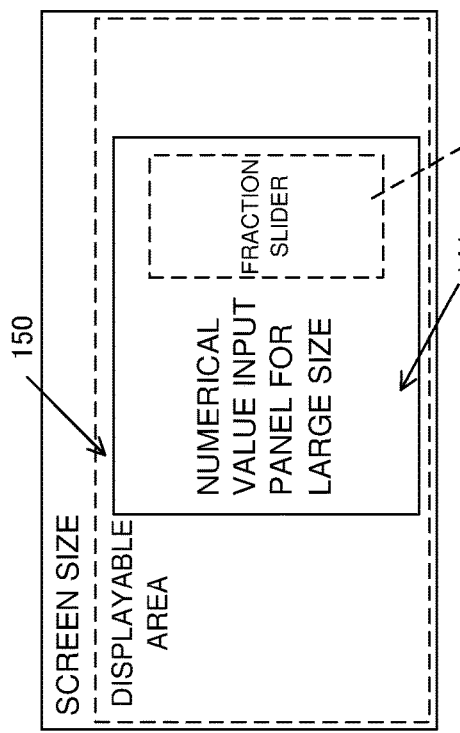

In the embodiment, the method A is described based on "slider type", from among this format, as an example, as shown in FIG. 3A. The slider type" has the following advantages.

A direct single-touch operation is accomplished (The method B described below requires one extra touch operation to display the option list).

It is possible to know, from the beginning, what kind of options are available (In the case of a method in which a list pops up, the user cannot know the contents until the list is displayed).

Method B: Select box type (see FIG. 3B, FIG. 3C, etc.) is used as an example. The method B is an inputting method in which the current value is displayed, and when the user transitions to the input state by tapping or the like, options for input temporarily appear on the screen.

In the method B, the size and area of the emerging inputter are not constrained by the size and location of the display area of the original inputter.

In general, the method B includes methods referred to as pull-down menus, drop-down lists, select box, etc. In the embodiment, the method B will be referred to as "select box".

The method B has an advantage that the select box can be arranged when the operation screen should have a minimum display area. Because not occupying any place except when making an operation, the method B also has an advantage of being able to cope with a narrow operation screen.
Characteristics of Method A and Method B of Numerical Value Input Panel 141 According to Embodiment FIG. 3A is an example of the numerical value input panel 141 employing the slider type, as the method A.

To input a decimal number value, drag and move a knob (a102) of a slider (a101) thereby to select a value.

In order to configure the numerical value input panel 141 incorporating such a fractional value slider, a sufficient space is required for the numerical value input panel 141.

Figure 3B:
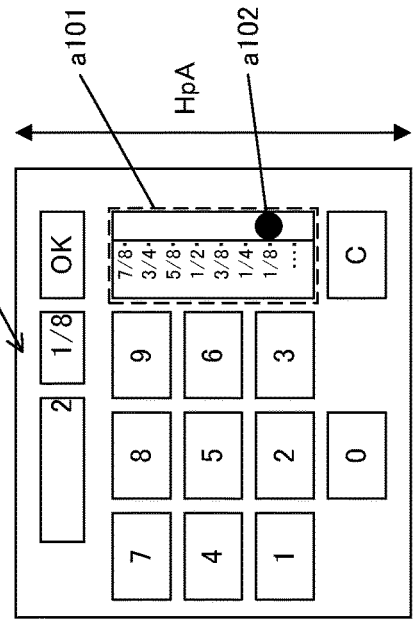
Figure 3C:
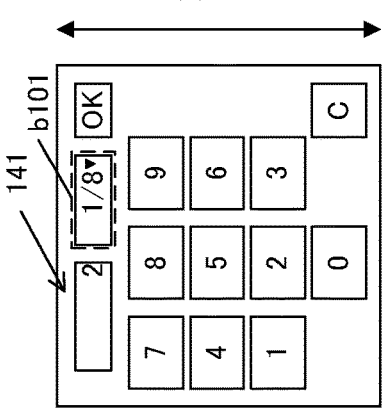

FIGS. 3B and 3C show an example of the numerical value input panel 141 employing a select box type, as the method B.

As shown in FIG. 3B, the initial state of the numerical value input panel 141 is that a fractional value setting item (b101) is displayed and a select box (b102) is not displayed.

To input a decimal number value, tap the fractional value setting item (b101) shown in FIG. 3B thereby to call up (pop up), on the screen, the select box (b102) shown in FIG. 3C, and tap any value in the select box (b102) thereby to select a fraction.

As shown in FIG. 3C, when the option of the fractional value of the select box (b102) is a method that pops up on the operation screen, the size of the numerical value input panel 141 can be reduced because it is not necessary to secure the option of the fractional value input in the numerical value input panel 141. Alternatively, conversely, the pop up portion can be made sufficiently large to be easily operated without being affected by the size of the numerical value input panel 141.

First Embodiment

A first embodiment will be described.

The selective use of the method A and method B of the numerical value input panel 141 according to the size of the screen of the display 150 (Original-Direct Entry (input of document) in the operation screens of 10 (inch) and 7 (inch)) is described below.

Figure 3D:
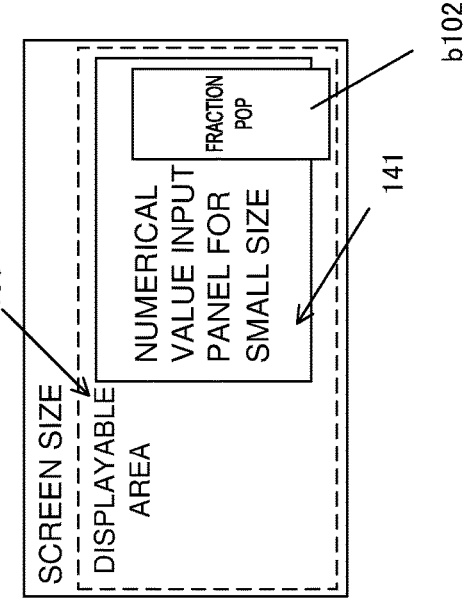
Figure 3E:
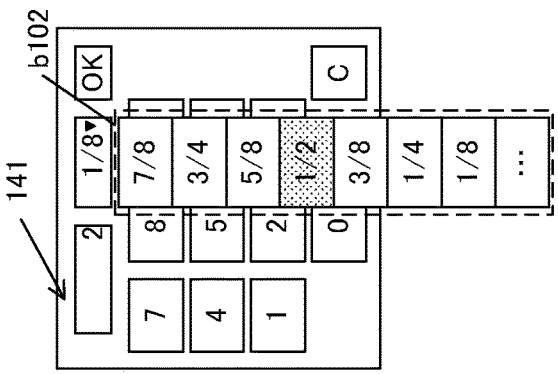

For example, consider the case where the operation of the same function is provided on a screen (numerical value input panel 141) with the same layout for two types of devices, one with a 10 (inch) operation screen (display 150) as shown in FIG. 3D and the other with a 7 (inch) operation screen (display 150) as shown in FIG. 3E.

When the design of the numerical value input panel 141 displayed on the 10 (inch) operation screen is reduced and displayed on the 7 (inch) operation screen, buttons of the numerical value input panel 141 become smaller on the 7 (inch) screen and operability is reduced.

The slider (a101) in FIG. 3A has a smaller touch area than those of the other buttons. If the size is enough to ensure the minimum operability on the 10 (inch) operation screen, the physical size of the touch area on the 7 (inch) operation screen becomes a size that makes it difficult to make accurate operation.

Therefore, as shown in FIG. 3D, in the 10 (inch) operation screen, the numerical value input panel 141 is provided with the slider type inputting method (method A) (slider (a101)) that is easy to operate, while as shown in FIG. 3E, in the 7 (inch) operation screen, the numerical value input panel 141 is provided with the select box type inputting method (method B) (b102) thereby to enable an accurate operation by making the individual button sizes of the pop-up options large enough to be operated.

Example of Setting Operation Procedure of Method A (Slider Type) (FIGS. 4A to 4B, FIGS. 5A to 5B)

Basic operations are described by citing, as an example, a setting screen (Original-Direct Entry screen 151) for "Original-Direct Entry".

The "Original-Direct Entry" is a function to allow the user to manually set the size of the copied document.

Two lengths, the lateral (X) and longitudinal (Y), are specified in millimeters (mm) or inches (inch).

Since the method of setting the lateral (X) and longitudinal (Y) is the same, the procedure for changing the initial value "11 (inch)" to "11¾ (inch)" as the length of the lateral (X) will be described herein referring to FIGS. 4A to 4B and FIGS. 5A to 5B.

Figure 4A:
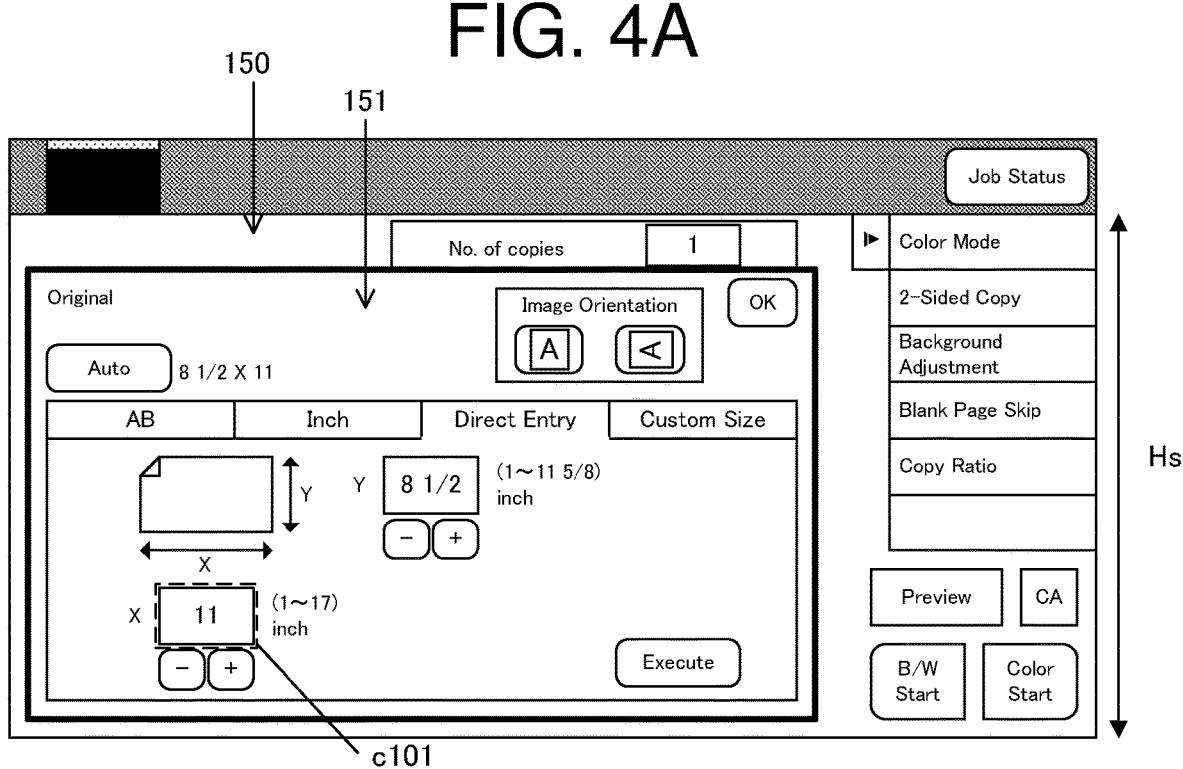
Figure 4B:
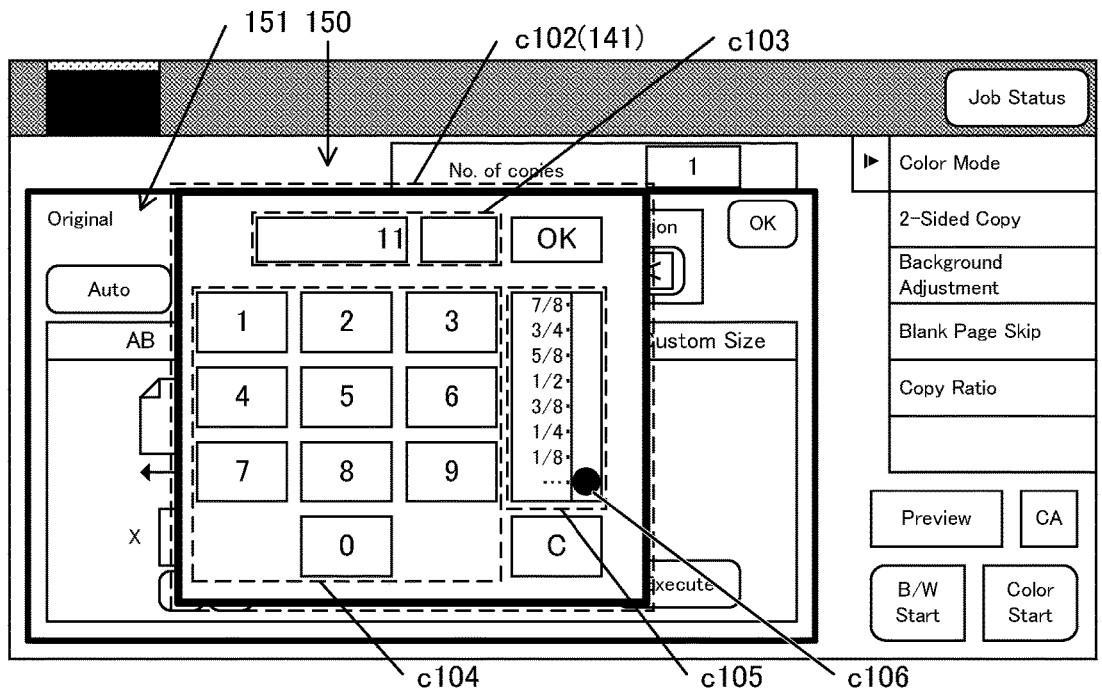

As shown in FIG. 4A, tapping a setting item (c101) of the lateral (X) on the Original-Direct Entry screen 151 displayed on the display 150 displays a numerical value input panel 141 (c102) on the setting screen, as shown in FIG. 4B.

As shown in FIG. 4B, the current set value is displayed on a set value display (c103) at the upper part of the numerical value input panel 141. In this example, the integer part is set to "11" as the initial value.

When an integer value needs to be inputted, the integer value is inputted by using a 10-key (numeric keypad) (c104), but in this example, no operation is executed because the integer part does not need to be changed. The integer part and fraction part may be operated from either side.

For the fraction part, drag a knob (c106) of a slider (c105) on the right side in the numerical value input panel 141 from "---" which indicates that the value is zero, and release a knob (c106) at the position of "¾". Alternatively, directly tapping the position of "¾" instead of the dragging is allowed.

Figure 5A:
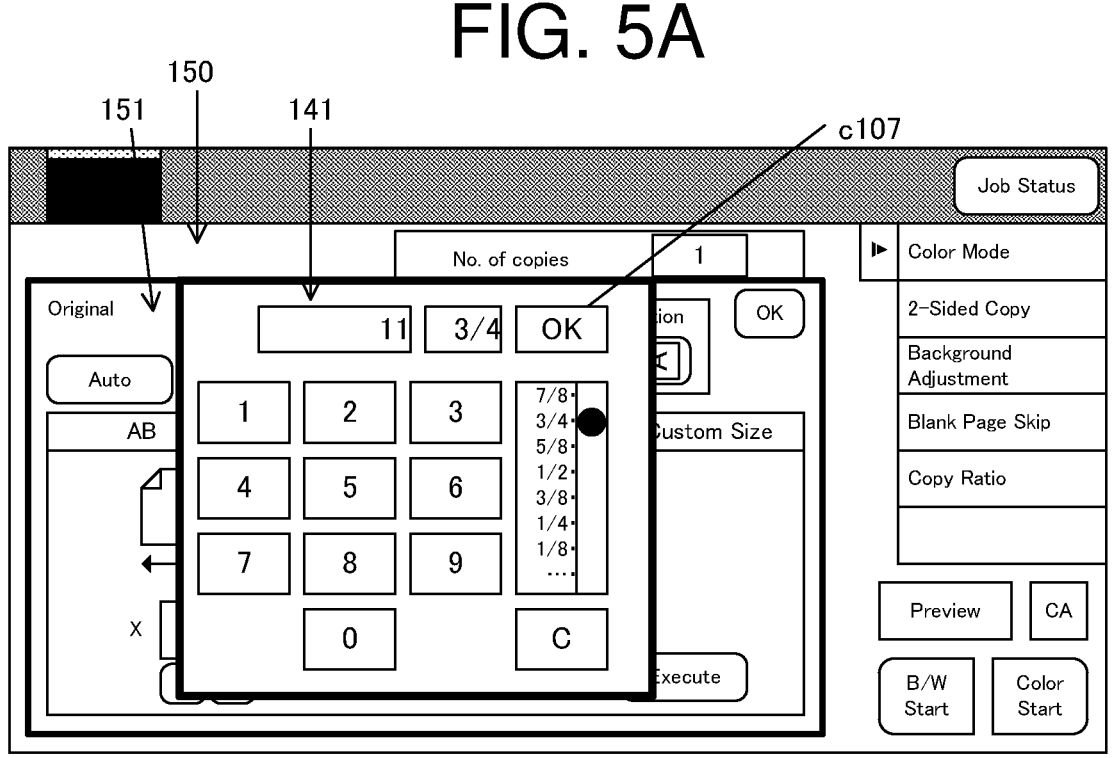
Figure 5B:
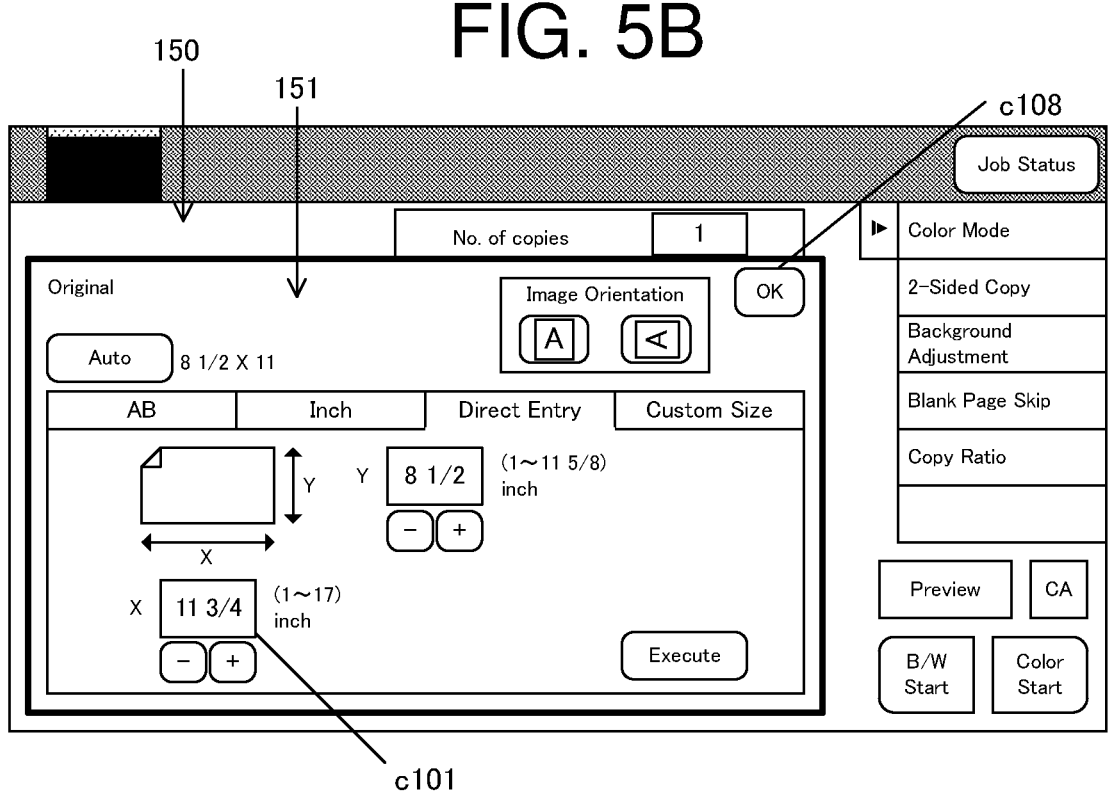

Then, "¾" is selected on the slider and "¾" is displayed in the fraction part of the upper set value display (c103) (FIG. 5A). Press an "OK" button (c107) of the numerical value input panel 141 thereby to close the numerical value input panel 141 and fix the input value. In the setting item (c101) of the lateral (X) (FIG. 5B), this has set "11¾" as the lateral (X) size of the document.

The above has described how to specify the fractional value with the slider type (method A).

Then, the setting of the document size is completed by pressing an "OK" button (c108) at the upper right of (FIG. 5B) the Original-Direct Entry screen 151.

Example of Setting Operation Procedure of Method B (Select Box Type) (FIGS. 6A to 7B)

The procedure for changing the initial value "11 (inch)" to "11¾ (inch)" as the length of the lateral (X) in a manner same as the method A described above is described with reference to the drawings.

Figure 6A:
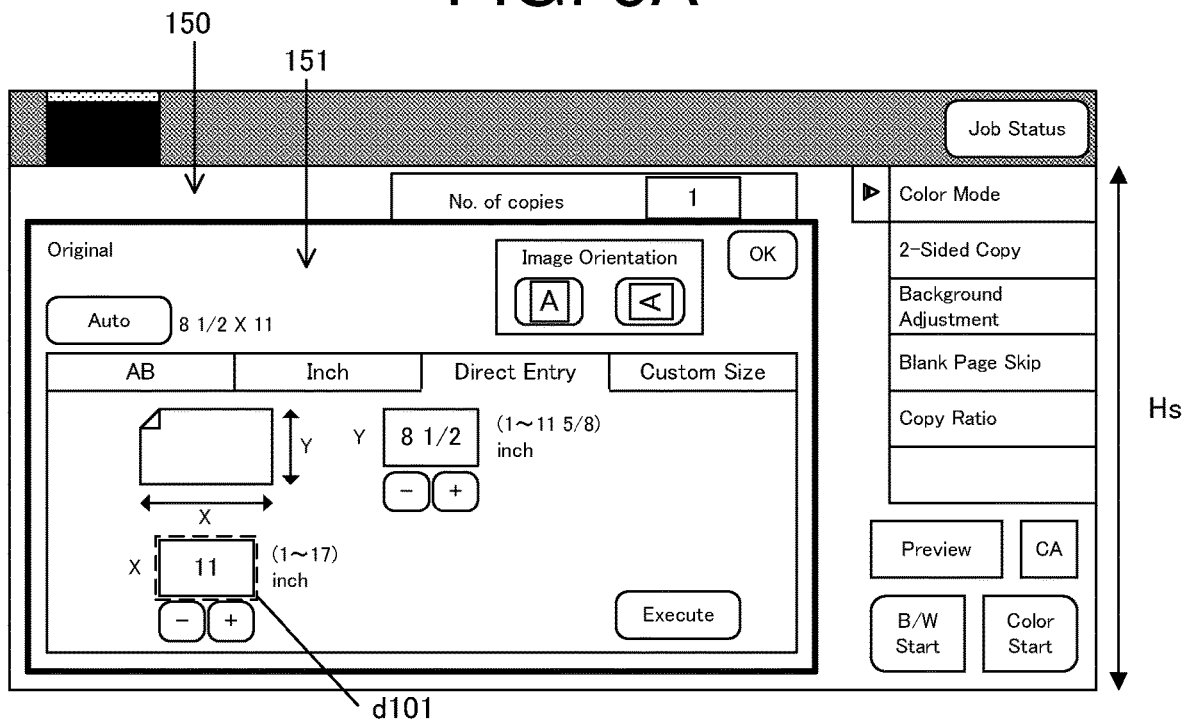
Figure 6B:
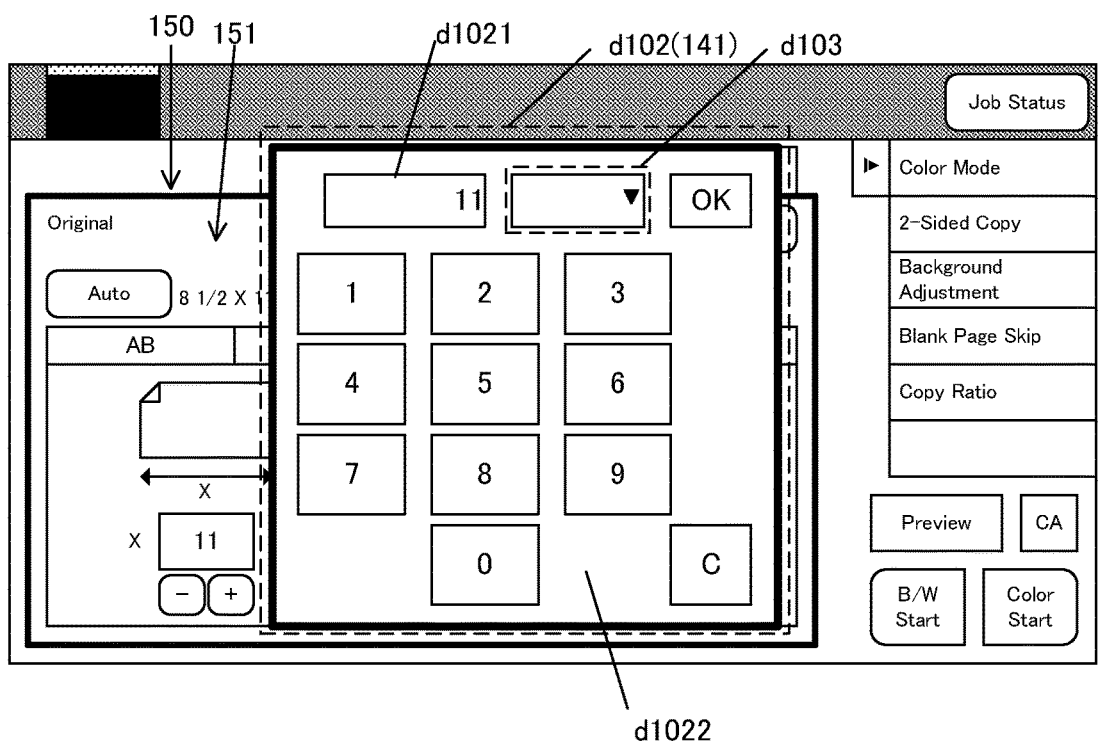

On the Original-Direct Entry screen 151 (FIG. 6A), tapping a setting item (d101) of the lateral (X) displays a numerical value input panel 141 (d102) on the setting screen (FIG. 6B). The description of an integer part (d1021) is omitted because the integer part (d1021) is based on the same setting (input by a numeric keypad (d1022)) as the method A shown in FIG. 4B above.

Figure 7A:
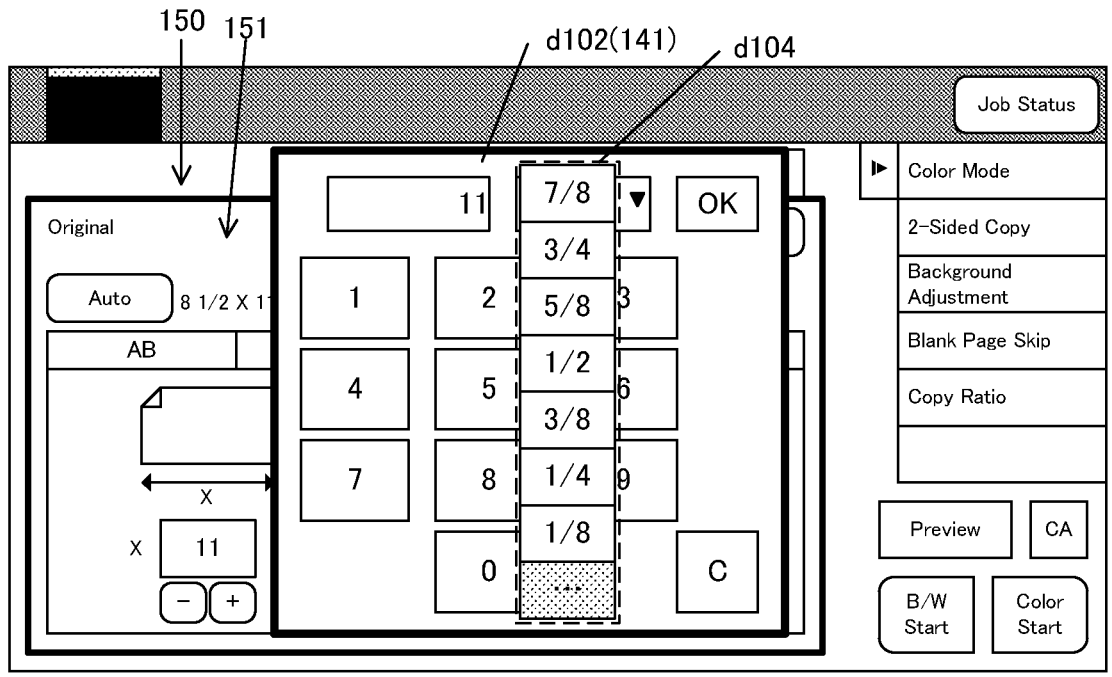

The fraction part is executed in a fractional value inputter (d103) located on the right side within the numerical value input panel 141 (d102). Tapping the fractional value inputter (d103) pops up an option list (d104) on the operation screen (FIG. 7A).

In the initial state, no fractional value is set, so "---" is selected to indicate that the value is zero.

Figure 7B:
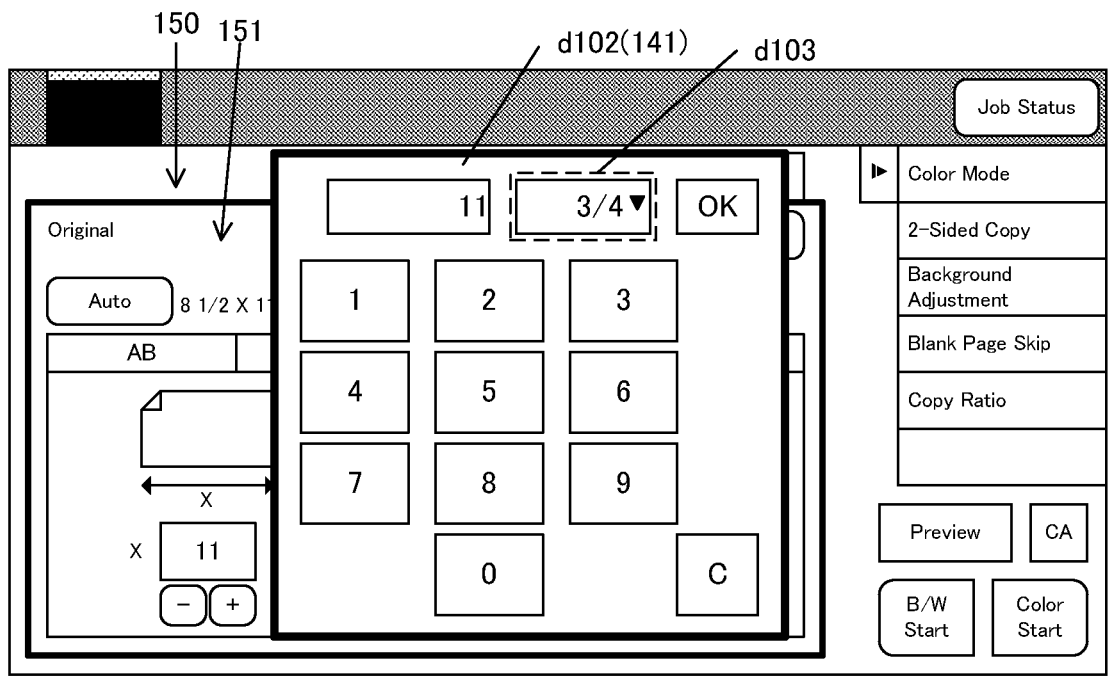

When the desired fractional value "¾" is tapped from the pop-up option list (d104), the pop-up option list is automatically closed and the tapped value (here "¾") is set in the fractional value inputter (d103) (FIG. 7B). When the "OK" button of the numerical value input panel 141 (d102) is pressed and the numerical value input panel 141 is closed thereby to fix the input value, "11¾" can be set as the lateral (X) size of the document in the setting item (d101 in FIG. 6A) of the lateral (X).

The above has described how to specify fractional values in the select box type of the method B.

Description of How to Switch Between Method A and Method B

Configurations of program and service can be realized by either of the following mode a. or mode b.

Mode a. Both of the method A and the method B are built into the same program and service, and switched with a detection of the size of a to-be-displayed screen.

Mode b. Detect the size of the to-be-displayed screen, and provides only the input screen of the suitable method.

Hereinafter described is an example of a control method seen when controlling by the method A.

Control Algorithm of Switching Screen Size

FIG. 8 is a flowchart of an algorithm of switching between the method A and the method B.

A screen area height required to display the numerical value input panel of the method A is defined as HpA (Height Panel type A) (see FIG. 3A).

A screen area height required to display the numerical value input panel of the method B is defined as HpB (Height Panel type B) (see FIG. 3B).

Here, the numerical value input panel is preliminarily designed so that HpA>HpB.

As shown in FIG. 8, in the controller 100, the numerical value inputting method controller 180 (numerical value input panel display controller) (see FIG. 2) obtains, from the system of the target device (image forming device in the embodiment), a height screen Hs (Height Screen) of an area available for display (step (hereinafter abbreviated to "S") 101).

The process determines whether Hs≥HpA or not (S102), and when the determination result is positive (Yes: Hs≥HpA), the process calls up the numerical value input panel (c102) (see FIG. 4B) of the method A (S103).

On the other hand, when the determination result of S102 is negative (No: Hs<HpA), the process calls up the numerical value input panel (d102) (see FIG. 6B) of the method B (S104).

The processing unit of the height (HpA, HpB) here is not the number of pixels of the display device employed for the display 150, but the physical size on the operation screen that is actually displayed.

However, if the physical size is considered to be proportional to the number of pixels, the number of pixels may be used as the unit.

About Determination of Screen Size

When the to-be-displayed device is predetermined, the inputting method may be selected in relation to the type of the device instead of the size of the device.

When the to-be-displayed device is not limited, the screen size is determined by obtaining, from each system, the specification information of the display device. In such a case, since the physical size actually displayed can be calculated from the number of pixels the pixel density which are occupied by the numerical value input panel, the appropriate numerical value inputting method can be selected and displayed according to the screen size if the threshold for switching each numerical value inputting method is preliminarily specified by the physical size.

The physical size can also be calculated by multiplying the number of pixels by the pixel pitch, as shown in the formula below.

$$\text{Physical size} = \text{Number of pixels} \times \text{Pixel pitch}$$

About Determination Criteria for Switching

Here, the switching is determined by the height only, but may be determined by the width of each of the screen and the numerical value input panel, or by both the height and the width, if necessary.

For determination of the display area, it is possible to selectively use three or more steps of display instead of two steps.

About Arrangement of Options

Although the numerical value input panel 141 of the embodiment shows the example in which the options are arranged longitudinally, the options may be arranged laterally or in two dimensions, longitudinally and laterally.

As described above, in the first embodiment, the numerical value inputting method controller 180 that selects the numerical value inputting method of the operator 140 is provided based on the physical display size of the operator 140 relative to the screen of the display 150, so that an appropriate numerical value inputting method can be selected and displayed according to the screen size of the display 150.

When the information processing device is applied to various devices having displays 150 of different display sizes respectively, the numerical value inputting method controller 180 selects the inputting method of the operator according to the size at which the operator can be displayed on the screen of the display, thereby making it possible to set an appropriate and easy-to-use operator according to the device. As shown in FIGS. 3A to 3E, the easy-to-use operator can be set on displays of various sizes.

Second Embodiment

Next, a second embodiment will be described.

Selective use of each function depending on the size of the space available for the input operation (Original-Direct Entry, Erase Specified Range).

Described is Erase Specified Range" as an example of a setting screen where the display area cannot be enlarged.

"Erase Specified Range" is a function to display a preview of the to-be-printed image on the screen before printing it on the paper, and to specify, on the screen, the range of the not-to-be-printed image and erase it.

All need to do to specify the range is to input the coordinates (X and Y) of a start point (upper left) of the rectangular area to be erased, as well as the height and width.

At the time of inputting each value, it is inefficient if the user cannot check whether the user has accurately specified a to-be-erased part while specifying the to-be-erased part. Therefore, the numerical value input panel need to be displayed at the same time in a manner not to overlap a preview image.

Figure 9A:
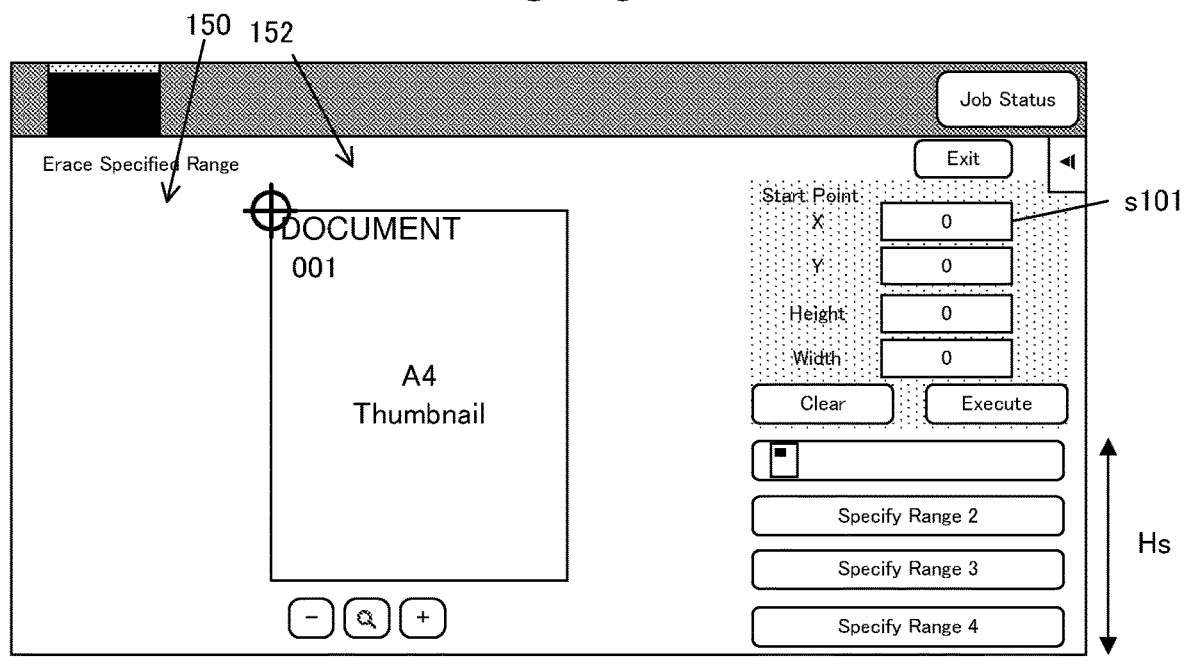
Figure 9B:
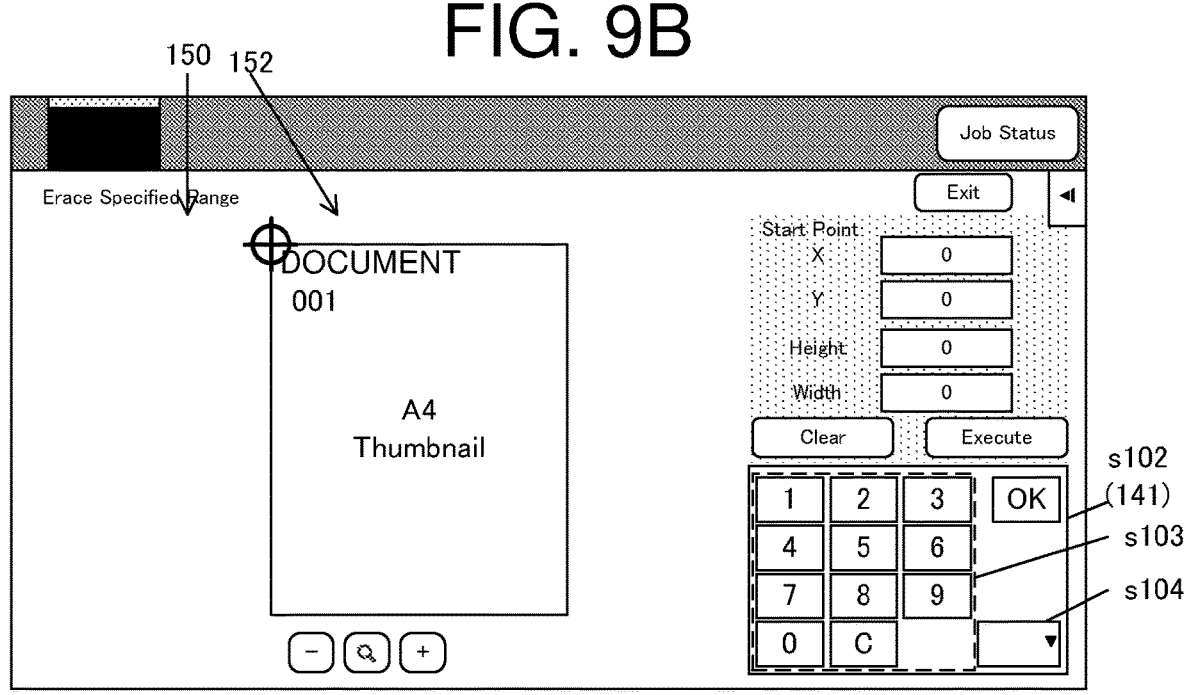

FIGS. 9A to 9B indicate an example of the setting screen for Erase Specified Range. In this example, an image (document image 001) is displayed in the center part of a setting screen 152, the current set value is displayed in the upper right part, and the numerical value input panel 141 is fixedly displayed in the lower right part.

Thus, the display form of the method B is beneficial when it is not possible to allocate a large area to the numerical value input panel 141.

Setting Operation Procedure of Method B (Select Box Type)] (FIG. 9A to FIG. 11B)

When the specified range erasing function is selected, the setting screen (erasing range setting screen) 152 as shown in FIG. 9A appears on the display 150.

Herein described is an example of inputting "1½" as a start point X (Start Point X).

First, tapping a setter (s101) of the start point X displays the numerical value input panel 141 (s102) in the lower right of the screen (FIG. 9B).

At this time, any of the integer and fraction may be inputted first, here, however, an integer "1" is first inputted in by a 10-key (numeric keypad) (s103). Specifically, tap the "1" button.

Figure 10A:
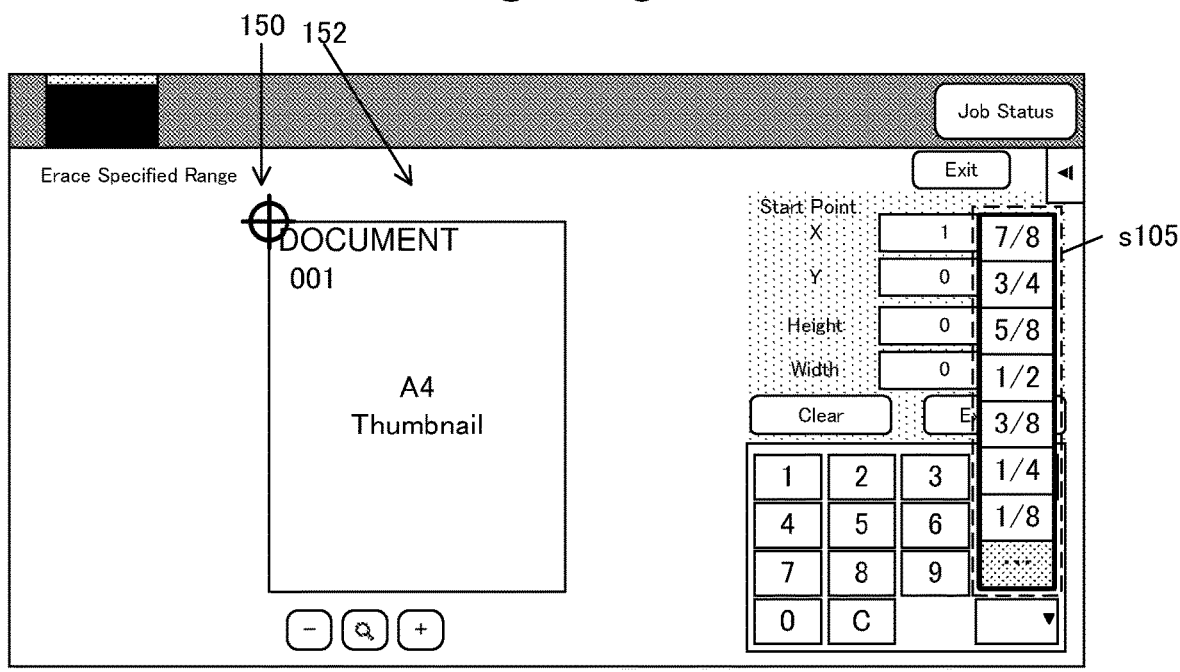

The fraction part is inputted with a fractional value inputter (s104) at the lower right of the numerical value input panel 141. Tapping the fractional value inputter (s104) pops up an option list (s105) on the operation screen (FIG. 10A).

Figure 10B:
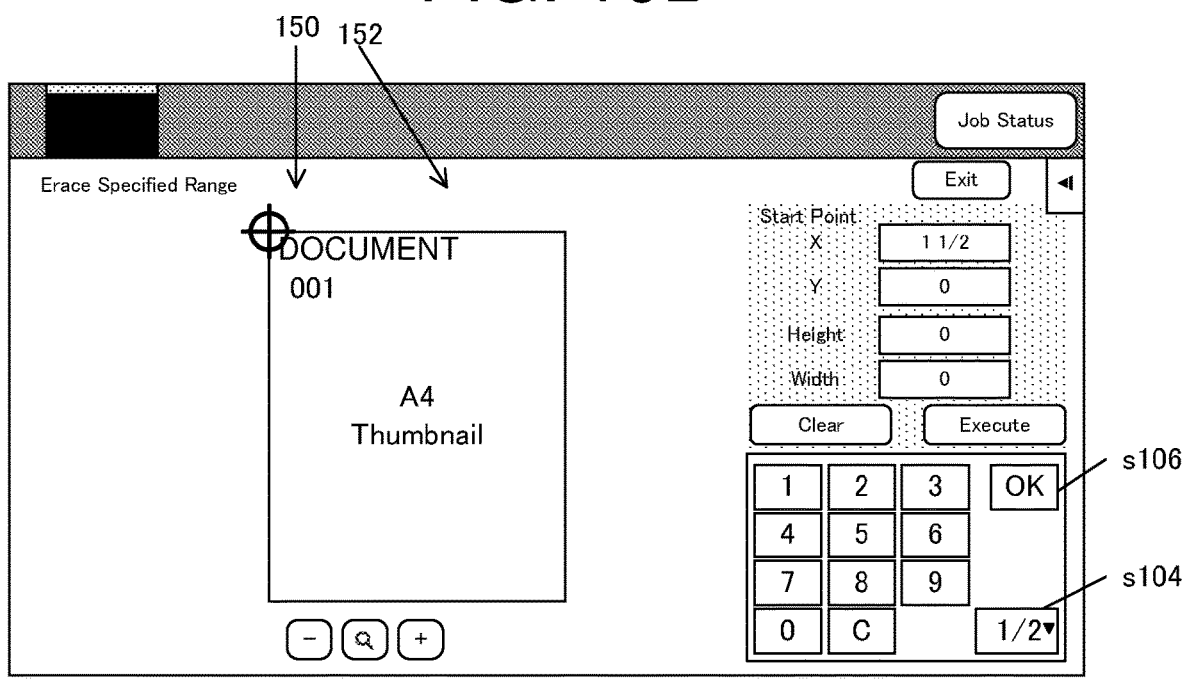

In the initial state, no fractional value is set, so "---", which represents zero, is in a state of being selected. Tapping the desired fractional value "½" automatically closes the pop-up option list (s105), and the tapped value (herein "½") is set in the fractional value inputter (s104) (FIG. 10B).

Figure 11A:
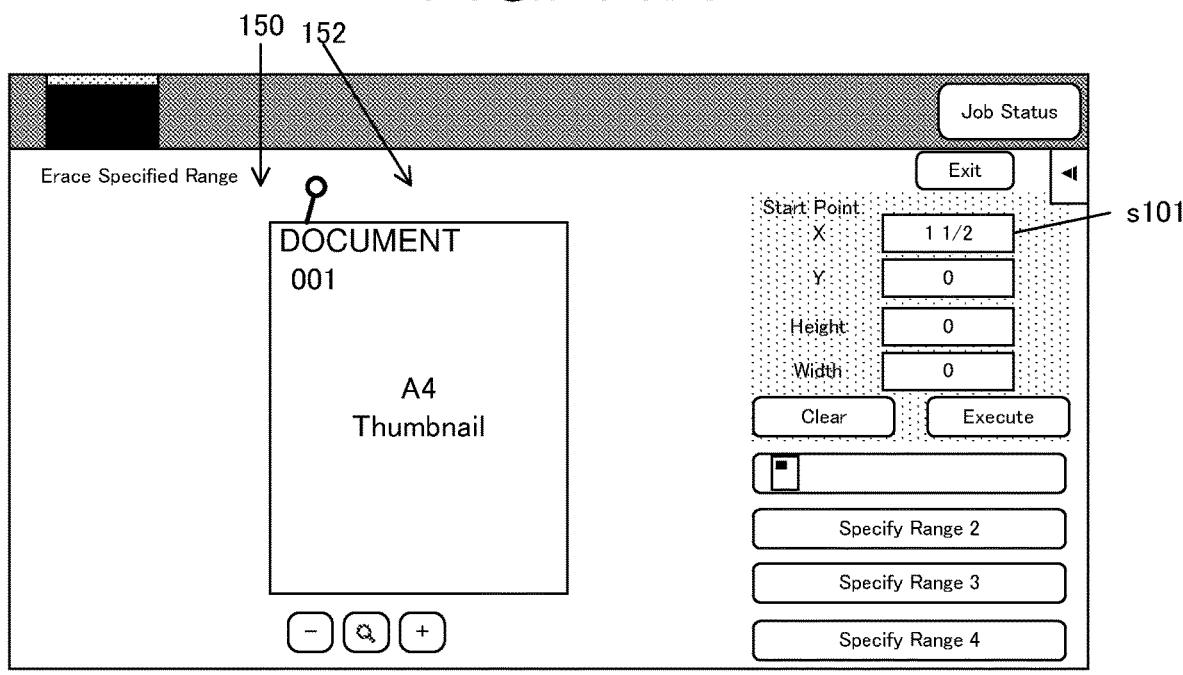

Then, the user presses an "OK" button (s106) on the numerical value input panel so as to fix the input value and close the numerical value input panel. With this, "1½" has been set for the start point X (s101) (FIG. 11A).

The above has described how to specify the start point X.

Figure 11B:
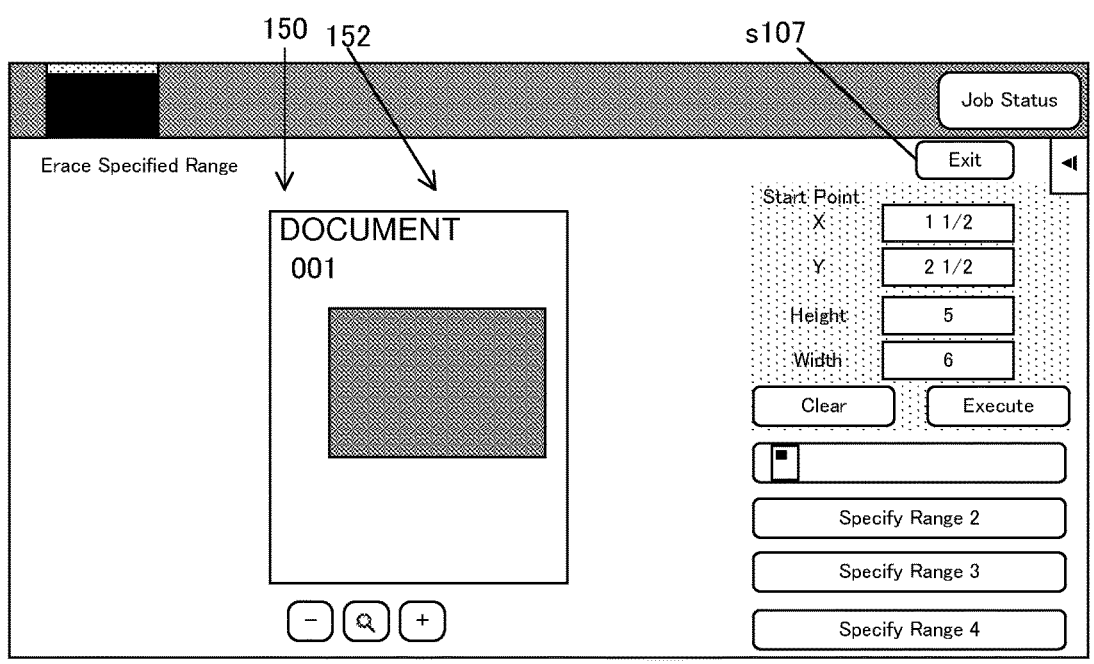

Then, after inputting the start point Y (Start Point Y), height, and width by the procedure same as for the start point X, press an "Exit" (s107) button in the upper right of the Erase Specified Range setting screen thereby to complete the setting of the specified range erasing function (FIG. 11B). The set specified range is the range shown by shading in the document.

Control Algorithm for Selectively Using Method A and Method B for Each Setting Item As in the first embodiment, a mechanism can be made so that, each time the numerical value input panel is displayed, the to-be-displayed area size Hs is obtained from the system thereby to switch between the method A and the method B. Herein described is, however, a control executed when the inputting method type to be displayed for each setting item is preliminarily defined.

FIG. 12 is an inputting method definition table that shows an example of a specific definition.

In advance, the inputting method of the numerical value input panel to be called up for each setting item of the setting screen and the display position in the display area are defined by the relative position in the operation screen.

There are provided inputting methods, that is, the method A and the method B as described above.

The display position shall be able to specify the center, upper left, upper right, lower left, and lower right of the operation screen.

FIG. 12 shows definitions for the input items of the three function setting screens (Original-Direct Entry, Erase Specified Range, and Margin Shift).

In the Original-Direct Entry setting screen, the method A is specified as the inputting method for the height and width of the setting items, and the center is specified as the display position respectively (see FIGS. 4A to 4B, FIGS. 5A to 5B).

In the Erase Specified Range setting screen, for each setting item (start point X, start point Y, height, width), the method B is specified as the inputting method, and the lower right is specified as the display position, respectively (FIG. 9A to FIG. 11B).

In the Margin Shift setting screen, the method A is specified as the inputting method of the Margin Shift width of the setting item, and the center is specified as the display position, respectively.

For example, to set the height of the document, in the Original-Direct Entry setting screen, the user taps the height item thereby to display the numerical value input panel. The display specifying information "Method A, Center" of the relevant input item is obtained from FIG. 12, thereby to so control that the input panel of the method A is displayed in the center of the display area.

To set the start point X of the Erase Specified Range, the user taps and selects the input item of the start point X thereby to display the numerical value input panel. The display specifying information of the relevant input item "Method B, Lower right" is obtained from FIG. 12, thereby to so control that the numerical value input panel 141 of the method B is displayed in the lower right of the display area.

Unit of Defining Inputting Method

Although the example of executing a definition for each setting item has been shown herein, the classification of the selective use of the inputting method may be executed by using other criteria, such as per screen or per function, if necessary.

Contents of Definition

The minimum required element is the inputting method. If the display position and the size are fixed, the definition is not necessary and may be controlled in any other method.

Further, the display position and the size may also be specified in any other method. For example, the display position may be specified as a ratio to the whole, or may be specified by the relative position of any other display element rather than the screen.

Third Embodiment

A third embodiment will be described.

The third embodiment is to selectively use the setting items (Margin Shift, Erase Specified Range) depending on the number of options.

In the information processing device according to the third embodiment, the numerical value inputting method controller 180 selects the numerical value inputting method according to the number of options when the options of the numerical values that can be input to the operator are limited.

Herein described is an idea about the selective use depending on the number of options.

The method A requires all the options to be placed on the screen at the same time, so if the user tries to display a large number of items in a small area, the size of each item becomes small, making the display difficult to see and the touch operation difficult. Even in the same display area, when options are small in number, the individual options can be displayed large.

That is, it is also beneficial to use the method A when there are few input item options for the target display area, and to provide the numerical value input panel of the method B when there are many options and the operation becomes difficult.

For example, when the purpose is to specify a size that conforms to the standard paper size, it is considered sufficient in most cases to be able to input the three values of 0, ¼, and ½ that exist in the general inch standard paper size.

This third embodiment shows an example of switching the inputting method according to the number of options for the input target items.

Examples of setting items with few options include the Margin Shift function, and examples with many options include the Erase Specified Range.

Margin Shift Function

The Margin Shift function is a function to secure a margin (Margin Shift) for binding printed matters such as stapling and punching. In order to secure the margin, it is necessary to shift the entire image in the opposite direction of the position where the entire image is bound and to perform printing, so it is necessary to specify the side to be margined and the amount of the margin.

As for the margin width, consider the case where it is sufficient to specify from 0 to 2 (inch) in ¼ (inch) unit. In this case, the four options of fractions needed would be 0, ¼, ½, and ¾.

Erase Specified Range

A function with many options includes the Erase Specified Range described in the second embodiment.

In the Erase Specified Range, it is necessary to accurately cover only the part of the image to be erased, so fine accuracy is required. For accomplishing a state of capable of specifying in ⅛ (inch) unit, there are eight options including 0, ⅛, ¼, ⅜, ½, ⅝, ¾, and ⅞.

Example of Operation Procedure for Setting Item with Few Options by Using Method A (Slider Type) (Margin Shift Setting), FIG. 13A to FIG. 14B The following explains the operation of the Margin Shift setting screen according to the figures.

Herein shown is the procedure for inputting "¾ (inch)" as the shift amount for left binding.

Figure 13A:
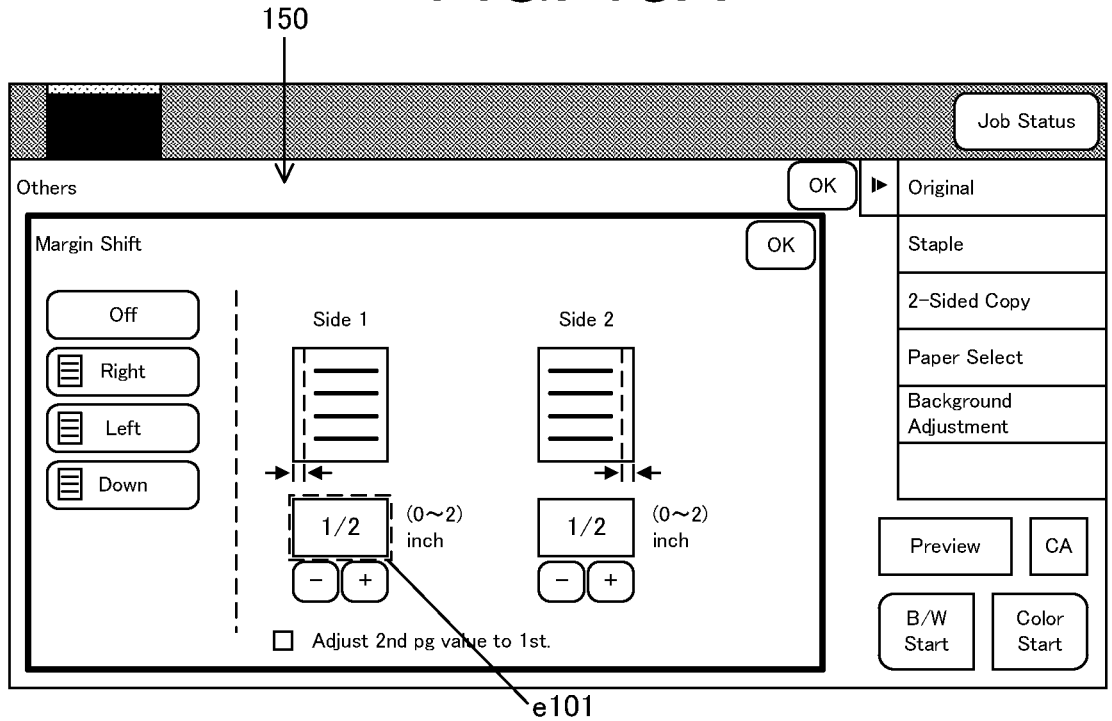
Figure 13B:
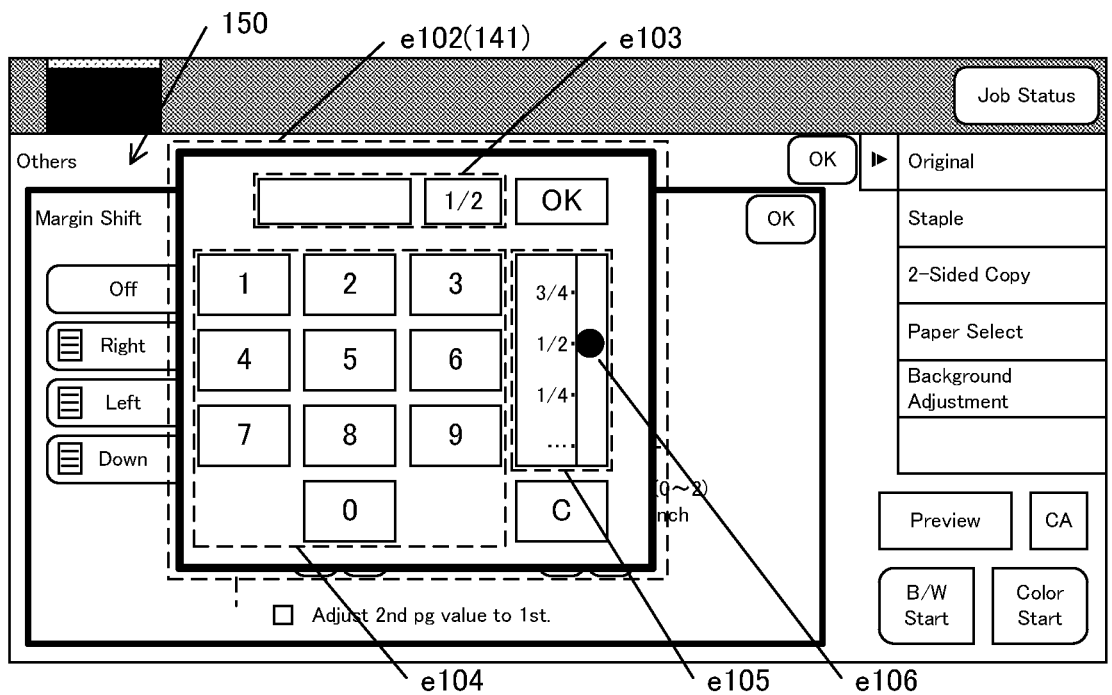

First, tapping a shift amount setting item (e101) on the Margin Shift setting screen (FIG. 13A) displayed on the display 150 displays the numerical value input panel 141 (e102 on the setting screen (FIG. 13B). The current set value is displayed in a set value display (e103) at the upper part of the numerical value input panel. In this example, "½" is set as the initial value.

In the set value display (e103), when an integer value needs to be inputted, the integer value is inputted with a 10-key (e104). In this example, however, the integer part is zero, so no operation is required.

In the set value display (e103), for the fraction part, drag, from "½", a knob (e106) of a slider (e105) on the right side in the numerical value input panel, and release the knob (e106) at the position of "¾". Alternatively, directly tapping the position of "¾" instead of the dragging is allowed.

Figure 14A:
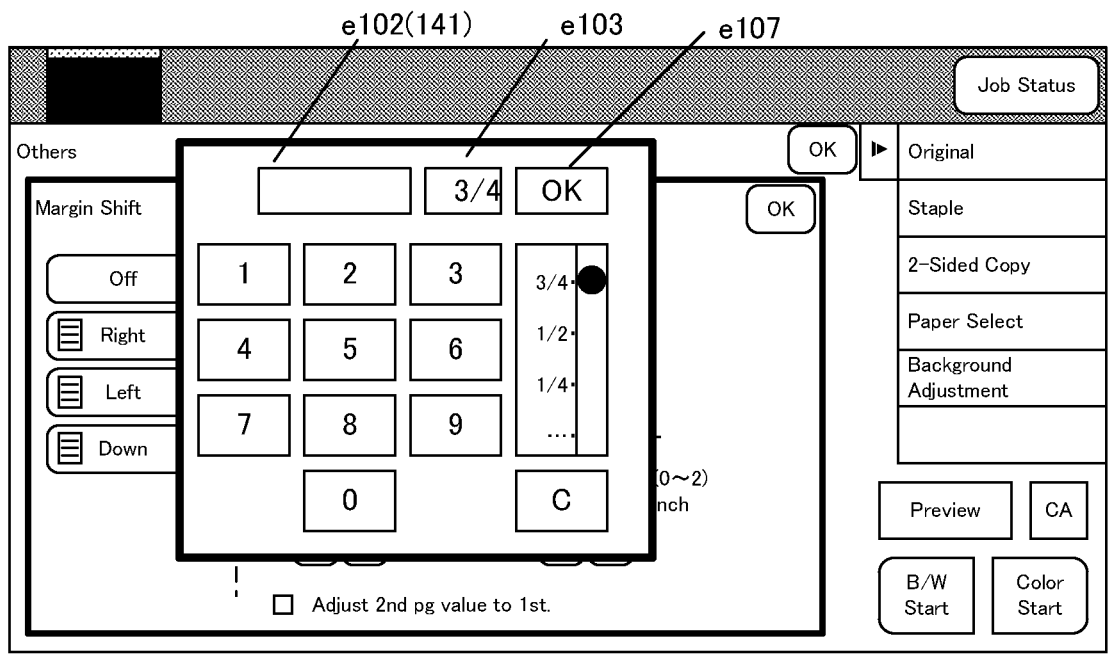
FIGS. 14A to 14B, following FIGS. 13A to 13B, indicate an illustration of the state in which the value selected by the slider is displayed on a setting display.
Figure 14B:
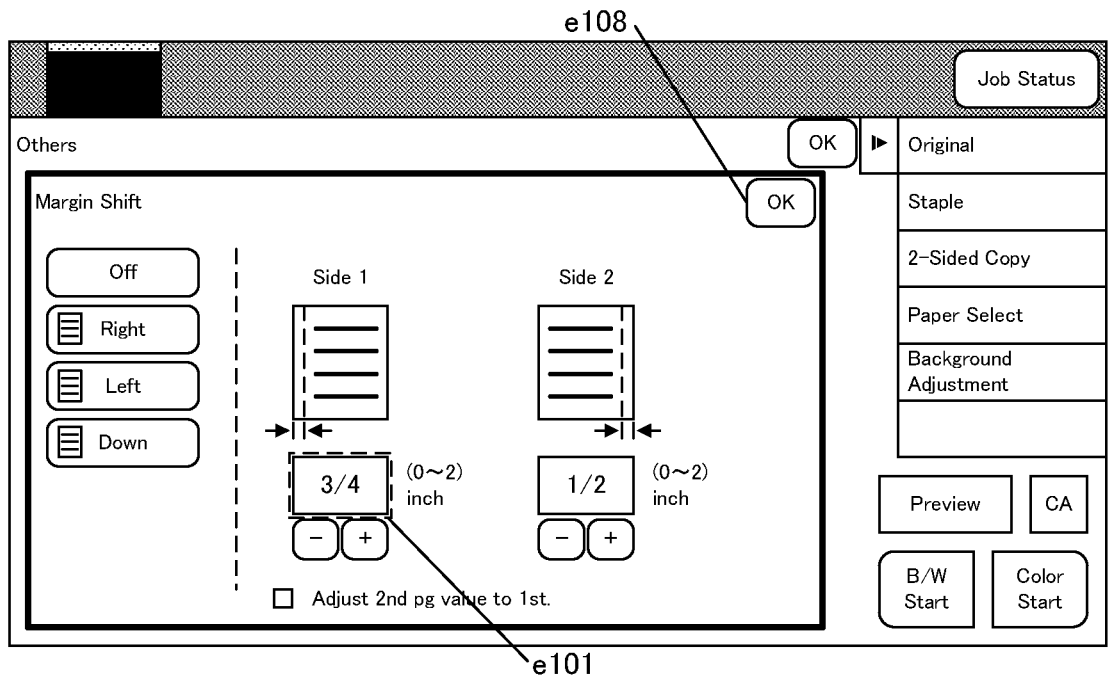

Then, "¾" is selected on the slider, and "¾" is displayed in the upper set value display (e103) (FIGS. 14A to 14B).

Press an "OK" button (e107) of the numerical value input panel 141 (e102) thereby to close the numerical value input panel and fix the input value. With this, "¾" has been set as the shift amount of the Margin Shift (FIG. 14B).

The above has described how to specify fractional values.

Pressing an "OK" button (e108) in the upper right of the Margin Shift setting screen (FIG. 14B) completes setting of the Margin Shift.

Control Algorithm

Figure 15:
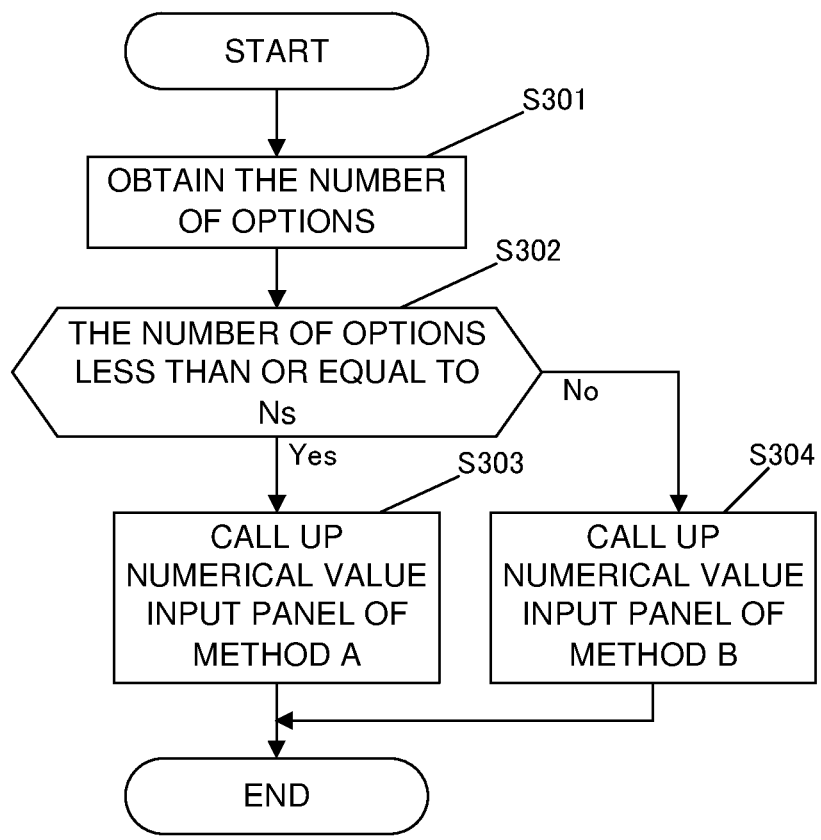
FIG. 15 is a flowchart of a procedure that switches the inputting method of setting items according to the number of options.

FIG. 15 shows a flowchart of an algorithm for selecting the method A and the method B.

A threshold of the number of options to determine which to use either the method A or the method B is defined as Ns.

An optimal value for the threshold Ns according to the screen size and according to the design of the numerical value input panel is defined in advance.

The number of options is obtained (S301), and the number of options is compared with a threshold Ns (S302).

It is so controlled that when the number of options for inputting fractional values of the target setting item is Ns or less (S302: Yes), the method A is provided as a numerical value input panel (S303), while when the number of options exceeds the threshold Ns, the method B is provided (S304).

For example, in the case of a system with a definition of Ns=5, the control of the setting items for each function is as follows.

Since the number of options in the Margin Shift is 4, the threshold Ns or less is satisfied and it is determined that the method A is to be displayed.

The number of options for Erase Specified Range is 8, which is greater than the threshold Ns, so it is determined that the method B is to be displayed.

In this way, which inputting method to use for display on the displayable area of the numerical value input panel is determined based on the required number of options of the setting item and the inputting method is selectively used, thus making it possible to provide the optimal operability.

Change Threshold According to Screen Size

The numerical value inputting method controller 180 may select the numerical value inputting method according to the physical display size of the operator and the number of options.

The control method of switching the inputting method by the number of options can be applied to the case where the screen size of the operation panel of the operator 140 is different as discussed in the first embodiment.

When the screen size is different, the maximum number of options that can maintain operability with the method A will also change.

The larger the screen, the greater the number of options that can be displayed at one time with the method A.

Therefore, selectively using the definition of a threshold Hs for each of the respective screen sizes can increase the number of targets to which the method A can be applied for each screen size and improve operability.

For example, when the definition is changed so that Hs=5 for 10 (inch) and Hs=3 for 7 (inch), the method A can be used for the input item that ensures the operability even on the 7 (inch) screen, thus increasing convenience.

Figure 16:
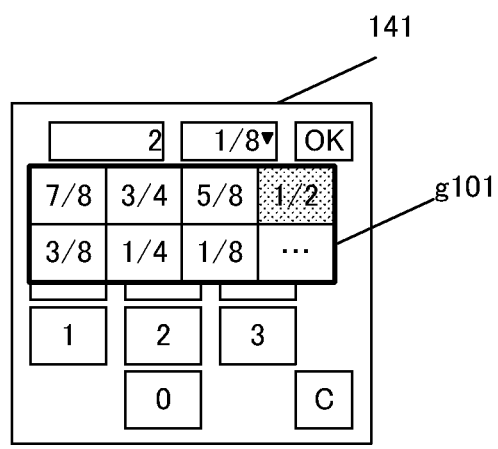
FIG. 16 is an illustration of another example about display of select box type options.
Figure 17:
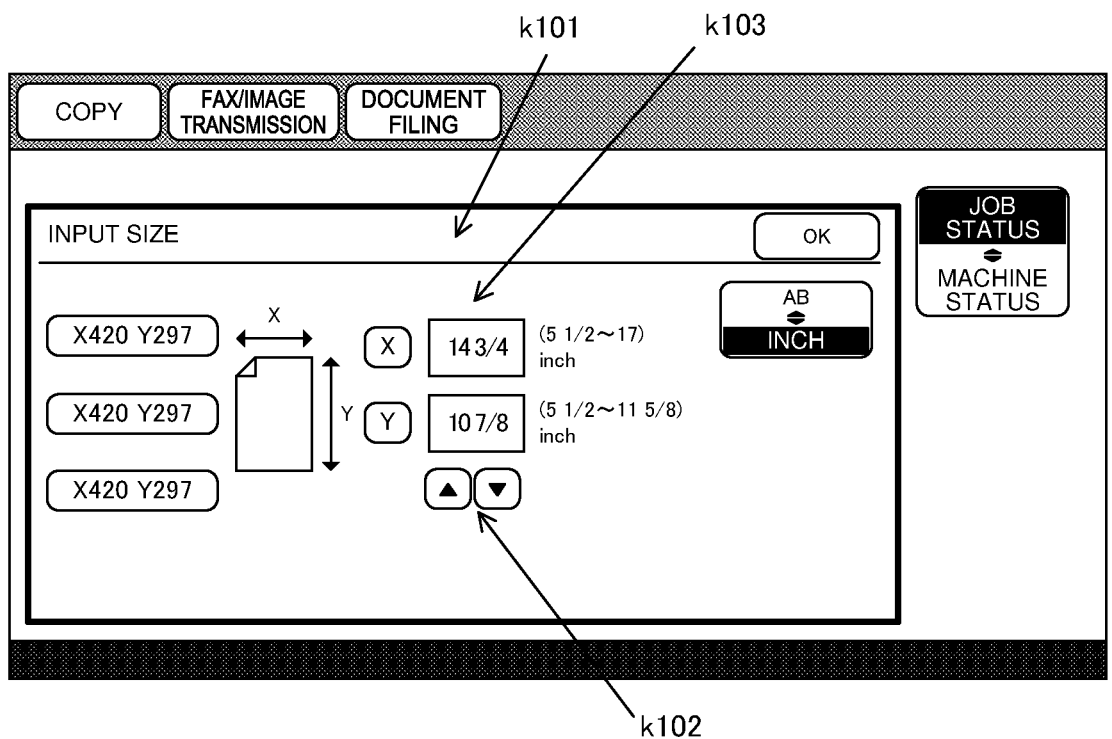
FIG. 17 is an illustration of a typical example of a numerical value input panel that inputs an integer part and a fraction part as an integrated numerical value.

In addition to the above embodiments, various displays in the numerical value input panel can be made into various formats. The fractional option list (d104) shown in the select box in FIGS. 7A to 7B are displayed longitudinally long. As shown in another example in FIG. 16, however, a display method of a select box option list (g101) can be displayed laterally long and in a plurality of lines. That is, instead of one-dimensionally arranging and displaying in one row, two-dimensionally arranging and displaying in a plurality of lines allows the numerical value input panel 141 of the display 150 to display more options in a small area corresponding to the lateral length. In addition, when being laterally long, the display form is arranged in the direction same as the direction of the digits of the numbers, thus making the display form easy to read.

In addition to integers and fractions, the numerical value inputter (numerical value input panel) of the information processing device can also input various numerical values such as decimal numbers, exponents such as $10^2$, logarithms such as log, and further Roman numerals such as I, IV, and X.

In addition to being employed in the image forming device, the information processing device can be used as an information processing device for any other device.

INDUSTRIAL APPLICABILITY

The information processing device of the present invention can be used for various devices having a numerical value inputter, other than the image forming device.

What is claimed is:

1. An information processing device comprising:
a display that displays a numerical value inputter on an operation screen, the numerical value inputter containing an integer part for inputting an integer value and a fraction part for inputting a fractional value by selecting the fractional value among a plurality of fractional values, the numerical value inputter inputting one numerical value by combining the integer value input in the integer part and the fractional value selected in the fraction part; and
a numerical value inputting method controller that selects a numerical value inputting method of the fraction part of the numerical value inputter based on a physical display size of the numerical value inputter relative to the operation screen.

2. The information processing device according to claim 1, wherein in a case of applying the information processing device to various devices having operation screens with display sizes different from each other, the numerical value inputting method controller selects the numerical value inputting method of the fraction part of the numerical value inputter according to a size at which the numerical value inputter is displayable on the operation screen.

3. The information processing device according to claim 1, wherein the numerical value inputting method is selected from a first method that selects the fractional value by a slider and a second method that selects the fractional value from a select box, and
the numerical value inputting method controller selects the first method when a height (Hs) of an area available for display is greater than or equal to a height required for displaying the numerical value inputter that uses the first method, and selects the second method when the available area height (Hs) is less than the required height.

4. The information processing device according to claim 1, wherein the numerical value inputting method controller selects the numerical value inputting method of the fraction part of the numerical value inputter based on a space in the operation screen available for displaying the numerical value inputter.

5. The information processing device according to claim 1, further comprising a storage that stores an input item, a display position of the numerical value inputter, and the numerical value inputting method of the fraction part of the numerical value inputter, in association with each other,
wherein, when the input item is selected, the numerical value inputting method controller displays, at the display position, the numerical value inputter that corresponds to the numerical value inputting method.

6. The information processing device according to claim 1, wherein when an option of the fractional value that can be input to the numerical value inputter is limited, the numerical value inputting method controller selects the numerical value inputting method of the fraction part of the numerical value inputter according to a number of options.

7. The information processing device according to claim 1, wherein the numerical value inputting method controller selects the numerical value inputting method of the fraction part of the numerical value inputter according to the physical display size of the operation screen and a number of options.

8. The information processing device according to claim 7, wherein the numerical value inputting method is selected from a first method that selects the fractional value by a slider and a second method that selects the fractional value from a select box,
and the numerical value inputting method controller selects the first method when the number of options is less than or equal to a predefined threshold, and selects the second method when the number of options is greater than the predefined threshold.

9. The information processing device according to claim 8, wherein a different value is defined for the predefined threshold based on the physical display size of the numerical value inputter.

10. The information processing device according to claim 1, wherein the integer value is input by 10-key.

11. A controlling method of an information processing device, the controlling method comprising:
obtaining a physical display size of a numerical value inputter relative to an operation screen;
displaying the numerical value inputter containing an integer part for inputting an integer value and a fraction part for inputting a fractional value by selecting the fractional value among a plurality of fractional values, the numerical value inputter inputting one numerical value by combining the integer value input in the integer part and the fractional value selected in the fraction part; and controlling a numerical value inputting method by selecting the numerical value inputting method of the fraction part of the numerical value inputter based on the obtained display size.

* * * * *